(12) United States Patent
Petschik et al.

(10) Patent No.: US 9,285,214 B2
(45) Date of Patent: Mar. 15, 2016

(54) POSITION DETECTOR AND LIGHT DEFLECTION APPARATUS

(75) Inventors: Norbert Petschik, Puchheim (DE); Vladimir Ponkratov, Puchheim (DE); Martin Valentin, Puchheim (DE); Hans-Joachim Münzer, Puchheim (DE)

(73) Assignee: SCANLAB AG, Puchheim (DE)

(*) Notice: Subject to any disclaimer, the term of this patent is extended or adjusted under 35 U.S.C. 154(b) by 152 days.

(21) Appl. No.: 14/113,668

(22) PCT Filed: May 2, 2012

(86) PCT No.: PCT/EP2012/058032
§ 371 (c)(1),
(2), (4) Date: Jan. 15, 2014

(87) PCT Pub. No.: WO2012/150264
PCT Pub. Date: Nov. 8, 2012

(65) Prior Publication Data
US 2014/0132962 A1    May 15, 2014

(30) Foreign Application Priority Data
May 2, 2011   (DE) .......................... 10 2011 050 030

(51) Int. Cl.
*G01B 9/02*    (2006.01)
*G01B 11/26*   (2006.01)
(Continued)

(52) U.S. Cl.
CPC ................ *G01B 11/26* (2013.01); *G01D 5/285* (2013.01); *G01D 5/38* (2013.01)

(58) Field of Classification Search
CPC .............................. G01D 5/3473; G01B 11/26
USPC .......................... 356/492, 496, 499, 507, 521
See application file for complete search history.

(56) References Cited

U.S. PATENT DOCUMENTS

| 3,756,723 A | 9/1973 | Hock |
| 4,694,164 A | 9/1987 | Noguchi |

(Continued)

FOREIGN PATENT DOCUMENTS

| CN | 1963384 | 5/2007 |
| DE | 2003492 | 8/1971 |

(Continued)

OTHER PUBLICATIONS

Office Action dated Jun. 1, 2015 from Chinese patent application No. 201280021358.1.

*Primary Examiner* — Jonathan Hansen
(74) *Attorney, Agent, or Firm* — K. David Crockett, Esq.; Niky Economy Syrengelas, Esq.; Crockett & Crockett, PC

(57) ABSTRACT

Position detector for determining the rotation angle position of a rotatably supported object, comprising a light source for producing a light beam, a diffraction grating, a mirror which is connected with the object in a co-rotating manner in such a way that the light beam is reflected therefrom onto the diffraction grating and passes over the diffraction grating during a rotation of the mirror, thereby producing diffraction light, an interference device which is configured such as to be able to bring different diffraction orders of the diffraction light to interference, thereby producing an interference pattern, a light detector by means of which a brightness course, caused by the passing over of the diffraction grating with the reflected light beam, of the interference pattern can be detected, and an evaluation unit by which the rotation angle position of the object can be determined based on the brightness course.

19 Claims, 12 Drawing Sheets

(51) Int. Cl.
  *G01D 5/28* (2006.01)
  *G01D 5/38* (2006.01)

(56) References Cited

U.S. PATENT DOCUMENTS

| | | | |
|---|---|---|---|
| 4,775,788 A | | 10/1988 | Harshberger, Jr. et al. |
| 5,424,833 A | | 6/1995 | Huber et al. |
| 5,969,346 A | * | 10/1999 | Nagasaka et al. ............. 250/234 |
| 6,771,377 B2 | | 8/2004 | Jones et al. |
| 2004/0213109 A1 | | 10/2004 | Ogata et al. |

FOREIGN PATENT DOCUMENTS

| | | |
|---|---|---|
| JP | 56018709 | 2/1981 |
| JP | 6312918 | 1/1988 |
| JP | 02118410 | 5/1990 |
| JP | 0611660 | 1/1994 |
| JP | 07128609 | 5/1995 |
| JP | 07218237 | 8/1995 |
| JP | 2000249525 | 9/2000 |
| JP | 2003279385 | 10/2003 |
| JP | 2004069717 | 3/2004 |

* cited by examiner

POSITION DETECTOR AND LIGHT DEFLECTION APPARATUS

FIELD OF THE INVENTIONS

The invention relates to a position detector, e.g. for use for determining the rotation angle position of an object which is rotatably supported, and a light deflection device having a position detector.

BACKGROUND OF THE INVENTIONS

In many areas, such as in the application of movable parts in the automated fabrication or processing of work pieces, the precise determination of spatial positions is of considerable relevance in order to, e.g., be able to fabricate or process components having low tolerance in an efficient manner. For example, the material processing of work pieces by a working laser beam requires a precise positioning of the working laser beam or working beam on a work pieces to be processed. The laser beam of a working laser is directed, e.g., by means of a galvanometer scanner, which comprises a scan mirror or working beam deflection mirror which is attached to a rotatably disposed shaft of a galvanometer drive, via reflection at the working beam deflection mirror to a desired spatial position, wherein the shaft and thus also the working beam deflection mirror can be set in rotation via a motor such that the optical path of the working laser beam can be spatially varied. By connecting two such galvanometer scanners in series, the laser light can be deflected in two dimensions. An exact control of the optical path requires a precise determining of the respective rotation angle positions of the shaft (and thus of the working beam deflection mirror).

For measurement of the angle position, e.g. in a galvanometer scanner, capacitive position detectors are often used, wherein, e.g., the rotatably disposed shaft is coupled to an electrode of a variable capacitor or to a dielectric which is disposed between the electrodes of a variable capacitor, and wherein the present rotation angle results from the measurement of the capacity of the variable capacitor. Such capacitive position detectors are often complex in design, have a high moment of inertia and show a temperature-dependent behavior.

Optical position detectors, in which a light blocker which is rotatably disposed by means of a shaft is illuminated by a light source and shadows more or less light depending on the angular position, are also often used. The present rotation angle then results from, e.g., the amount of light which passes the light blocker and which is measured by a corresponding detector. Such optical position detectors often have a distinctive temperature dependency and temporal drift and can show a non-linear output characteristic at relatively small resolving power.

Alternatively, position detectors with movable optical gratings are used, wherein, e.g., a circular scale disk having a scale pattern or line pattern which is provided in the vicinity of the outer circumference of the disk is attached to the rotatably disposed shaft, and wherein the rotation angle position of the shaft can be determined by optical scanning of the scale pattern. Normally, such position detectors have good linearity as well as small temporal drift and deliver a high angle resolution. However, the moment of inertia of the assembly which is to be moved by the motor of the shaft is substantially increased by the scale disk, the more so as the achievable angle resolution is the higher, the larger the diameter and thus also the moment of inertia (which strongly increases with the diameter) of the scale disk is. This increase of the moment of inertia increases the inertia of the positioning system and thus complicates a fast repositioning of the shaft to another rotation angle position. The dynamics of such a system is reduced amongst others by the lower eigenfrequencies, which are caused by the high moment of inertia, and is thus deteriorated.

SUMMARY

The invention provides a position detector which allows a precise determining of the rotation angle position of a rotatably supported object, which works in a temporally stable manner and which allows for a positioning system having a small inertia, as well as a light deflection device having a corresponding position detector.

According to an aspect of the invention, a position detector for determining the rotation angle position of a rotatably supported object is provided, comprising a light source for producing a light beam, a diffraction grating, a mirror which is connected to the object in such a way that it co-rotates with the object during a rotation of the object and which is disposed in such way that the light beam is reflected therefrom onto the diffraction grating and that, during a rotation of the mirror, the reflected light beam passes over the diffraction grating according to the rotation, wherein the light of the reflected light beam is diffracted by the diffraction grating, thereby producing diffraction light, an optical interference device which is disposed in the optical path of the diffraction light and is configured such as to be able to bring different diffraction orders of the diffraction light to interference, thereby producing an interference pattern, a light detector which is disposed and configured such as to be able to detect a change in brightness, which is caused by said passing over of the diffraction grating with the reflected light beam, of the interference pattern as well as a brightness course comprising the change in brightness, and an evaluation unit which is connected with the light detector and is configured such as to be able to determine the rotation angle position of the object based on the brightness course.

By being able to determine the rotation angle position of the object via evaluating the brightness course during said passing over of the diffraction grating with the light beam (having no mass), the moment of inertia of the rotatably supported assembly, which comprises the object and the mirror, can be kept small. For example, the dimensions of the mirror can be kept small (the dimensions can, e.g., approximately correspond to the cross sectional dimensions of the light beam) such that the contribution of the mirror to the moment of inertia can be kept small.

As light source, e.g., a light source by which monochromatic light can be produced or a light source by which coherent light (e.g. laser light) can be produced, such as a laser or a laser diode, may be provided. However, a light source may be provided by which non-monochromatic, non-coherent light can be produced, wherein such a light source may be formed, e.g., in form of a light diode. The light beam produced by the light source may, e.g., be collimated before impinging onto the mirror by means of a collimation optics which may be disposed in the optical path between the light source and the mirror.

The light of the light beam reflected from the mirror towards the diffraction grating is diffracted at the diffraction grating, wherein diffraction light of any diffraction orders can be produced. The intensity maxima of the diffraction light of a respective order may occur at a respectively associated deflection angle with respect to the light beam which is incident onto the diffraction grating (or with respect to the grating normal of the diffraction grating), wherein the individual diffraction reflexes or diffraction orders diverge and are thus spatially separated from each other. In the following, the light of the order of a diffraction reflex of the respective diffraction order is understood under the term "diffraction order" or "light of a diffraction order" if nothing else is apparent from the context.

By the optical interference device which is disposed in the optical path of the diffraction light, different diffraction orders, e.g. a part of the diffraction orders or all diffraction orders, of the entirety of the diffraction orders which are produced by the diffraction grating are brought to interference. For example, the optical interference device may comprise an arrangement of optical elements, e.g. apertures and/or lenses, via which the different diffraction orders can be selected from the entirety of the diffraction orders (e.g. by means of one or more apertures which transmit the diffraction reflexes of the different diffraction orders to be selected and which mask or block the remaining diffraction orders) and via which the light of the diverging reflexes of the selected, different diffraction orders can be again brought together (e.g. by means of corresponding focusing lenses) and can thus be brought to interference, thereby producing an interference pattern.

The interference pattern may, e.g., comprise brighter portions (i.e. portions of higher light intensity) of constructive interference and (in contrast thereto) darker portions (i.e. portions of lower light intensity) of destructive interference, wherein the occurrence of the regions of constructive and destructive interference and thus also the (total) brightness and/or the (spatial) brightness distribution of the interference pattern may be influenced via the phase relationships of the light of the different diffraction orders.

During a rotation of the object (e.g. about an associated rotation axis), the mirror co-rotates with the same, wherein the light beam which is reflected from the mirror towards the diffraction grating passes over the diffraction grating. The diffraction grating may, e.g., be realized as a reflection or phase grating, e.g. as a blazed grating, wherein the diffraction grating may, e.g., be formed (for instance by a corresponding choice of a blaze angle of a diffraction grating formed as a blazed grating) such as to diffract as much light as possible into the reflexes of the selected, different diffraction orders. The diffraction grating may, however, e.g., also be realized as a transmission grating. The diffraction grating may, e.g., comprise a diffraction structure which is periodical along one or more periodicity directions and which, e.g., consists of an arrangement of equidistant line-like diffraction structure elements. The mirror may, e.g., be disposed in such a way that, during the rotation of the mirror, the light beam reflected towards the diffraction grating passes over the diffraction grating substantially in parallel to a periodicity direction of the diffraction structure of the diffraction grating, wherein, during said passing over of the diffraction grating, the phases of the light of the individual diffraction orders and the phase relationships or phase differences of the produced diffraction orders may change among themselves.

A change of the phase relationships of the light of the (selected) different diffraction orders among themselves may lead to a change in brightness, e.g. to a change of the total brightness and/or the spatial brightness distribution, of the interference pattern produced by the optical interference device, wherein such a change in brightness as well as an associated brightness course can be detected by the light detector during said passing over of the diffraction grating via the reflected light beam and, e.g., can be converted by the evaluation unit into a change in the rotation angle position or a present rotation angle position, resulting from the same, of the object. The term "change in brightness" covers here, e.g., a change of the absolute total brightness of the interference pattern (at, e.g., constant relative spatial brightness distribution) and a change of the spatial brightness distribution of the interference pattern (at, e.g., constant absolute total brightness) but also a combination of a change of the absolute total brightness with a change of the spatial brightness distribution. As light detector, an assembly having one or more, e.g. correspondingly constructed, photo diodes, photo resistors, CCD sensors or any other light detectors may be used.

According to a further aspect of the invention, there is provided a light deflection device having a rotatably supported working beam deflection mirror for deflecting a working light beam (or working beam) and a position detector for determining the rotation angle position of the working beam deflection mirror, wherein the position detector comprises: a light source for producing a light beam, a diffraction grating, a mirror which is connected to the working beam deflection mirror in such a way that it co-rotates with the working beam deflection mirror during a rotation of the working beam deflection mirror and which is disposed in such way that the light beam is reflected therefrom onto the diffraction grating and that, during a rotation of the mirror, the reflected light beam passes over the diffraction grating according to the rotation, wherein the light of the reflected light beam is diffracted by the diffraction grating, thereby producing diffraction light, an optical interference device which is disposed in the optical path of the diffraction light and is configured such as to be able to bring different diffraction orders of the diffraction light to interference, thereby producing an interference pattern, a light detector which is disposed and configured such as to be able to detect a change in brightness, which is caused by said passing over of the diffraction grating with the reflected light beam, of the interference pattern as well as a brightness course comprising the change in brightness, and an evaluation unit which is connected with the light detector and is configured such as to be able to determine the rotation angle position of the working beam deflection mirror based on the brightness course.

According to this aspect of the invention, the rotatably supported object may, e.g., be the rotatably supported working beam deflection mirror of the light deflection device. The light deflection device may, e.g., be a galvanometer scanner for directing or positioning a working light beam in form of a working laser beam, wherein the working beam deflection mirror may, e.g., be attached to a rotatably supported shaft of the galvanometer scanner. For example, the working beam deflection mirror of such a galvanometer scanner may be provided at an axial end of the rotatably disposed shaft, and the mirror of the position detector may be attached at the opposite axial end of the shaft. The rotatably supported object may also be the shaft itself of such a light deflection device or of such a galvanometer scanner.

According to an embodiment, the mirror is integrally formed with the (rotatably supported) object.

For example, a surface of the rotatably supported object may be formed as a mirror surface. For example, in a light deflection device (e.g. a galvanometer scanner) having a working beam deflection mirror, which, e.g., may be attached to a rotatably supported shaft of the light deflection device, for directing a working light beam (e.g. working laser beam), the working beam deflection mirror may be simultaneously provided as the mirror for directing the light beam, or a rear side of the working beam deflection mirror may be formed as the mirror for directing the light beam. A surface may, e.g., also be formed at the shaft of the galvanometer scanner as the mirror for directing the light beam. According to this configuration, the position detector may, e.g., be realized without an additional contribution to the moment of inertia of the rotatably supported object.

According to an embodiment, the mirror is shaped and disposed in such a way that a rotation axis of the object extends in a mirror surface of the mirror.

For example, the mirror may be formed as a flat mirror or plane mirror and be disposed in such a way that the rotation axis of the object extends through the flat mirror surface. In doing so, the light source and/or the mirror may, e.g., be disposed in such a way that the light beam produced by the light source impinges on the mirror on a position which is located on the (virtual) intersection line of the rotation axis with the mirror surface. It may thereby, e.g., be ensured that the light beam can be reflected from the mirror onto the diffraction grating over a large rotation angle range even at small dimensions of the mirror. Furthermore, e.g., a configuration may thereby be possible in which the reflected light beam is sent substantially always from the same spatial position for different rotation angle positions of the mirror. Furthermore, the mirror may, e.g., be formed and disposed in such a way that the center of gravity of the mirror is located on the rotation axis, wherein, e.g., it can be prevented that an imbalance with respect to the rotation axis is caused by the mirror. In analogous manner, the mirror may, e.g., be shaped and disposed in such a way that a rotation point of the object is located in a mirror surface of the mirror.

According to a further embodiment, the diffraction grating is a curved diffraction grating having a concavity facing towards the mirror.

When using a flat diffraction grating, the optical path, which is covered by the reflected light beam starting from the mirror until impinging onto the diffraction grating, and the angle of impingement, at which the reflected beam impinges on the diffraction grating, may, e.g., vary with the rotation angle of the mirror. By means of a curved diffraction grating having a concavity facing towards the mirror, such a variation of the optical path and/or of the angle of impingement with the rotation angle may, e.g., be at least partially compensated, whereby a characteristic of the position detector, which is substantially constant at least over a larger rotation angle range, can be ensured.

According to an embodiment, the curved diffraction grating is a cylindrical diffraction grating which is disposed concentrically to a rotation axis of the object. In analogous manner, the curved diffraction grating may, e.g., be a spherical diffraction grating (i.e. a diffraction grating in form of a spherical segment) which is disposed concentrically to a rotation point of the object.

According to such an embodiment, e.g. when the mirror and/or the light source are disposed in such a way that the rotation center (in form of the rotation axis or the rotation point) of the object is located in the mirror surface of the mirror and the light beam coming from the light source impinges onto the mirror on a position of the rotation center, it can, e.g., be ensured that the optical path, which is covered by the reflected light beam between the mirror and the diffraction grating, and the angle of impingement, at which the reflected beam impinges onto the diffraction grating, may be independent from the respective rotation angle position of the mirror or the object, whereby, e.g., a characteristic of the position detector, which is substantially constant over the total rotation angle range of the object, can be ensured.

As described above, the light beam produced by the light source may be collimated by means of a collimation optics and may thus, e.g., impinge onto the diffraction grating as a collimated beam. However, the light beam coming from the light source may, e.g., be focused, e.g. after passing through such a collimation optics, by means of corresponding optics. The light beam may, e.g., be focused on a position between the light source and the mirror or on a position on the mirror. The light beam may also be focused on a position between the mirror and the diffraction grating or to focus the light beam on a position being located on the diffraction grating or on a position behind the diffraction grating (i.e. on a position which is located on a side, which faces away from the mirror, of the diffraction grating), wherein, in the latter case, the light beam is diffracted by the diffraction grating before reaching the focus position. For example, the shape—e.g. the divergence or convergence—of the beam, running from the diffraction grating, of diffraction light may be influenced by the location of the focus position of the light beam running towards the diffraction grating (and by the shape of the diffraction grating).

According to an embodiment, the diffraction grating is formed as a reflection grating, wherein the position detector further comprises an incoming beam focusing optics which is disposed between the light source and the mirror in the optical path of the light beam and is configured such as to focus the light beam, which is reflected from the mirror towards the reflection grating, on a focal point or on a focal line of the reflection grating or towards the vicinity of such a focal point or such a focal line (in the following the term "focal point" is also used correspondingly for the "focal line", i.e. the term "focal point" correspondingly characterizes in this context a focus or a focus position of an optical element, e.g. of the reflection grating, wherein, in case of doubt, the respective meaning results from the context).

According to this embodiment, e.g. when the light beam which is reflected from the mirror towards the reflection grating is (substantially) focused on the focal point of the reflection grating, a beam, which is (taking into account the divergence of the diffraction reflexes produced by the reflection grating) substantially collimated, of diffraction light may, e.g., be produced during the reflection of the light beam on the reflection grating, which may facilitate, e.g., transmitting the diffraction light, e.g., to the optical interference device. For example, the reflection grating may be formed as a curved diffraction grating having a concavity facing towards the mirror, e.g. as a cylindrical grating having an associated cylinder curvature radius, and the incoming beam focusing optics may, e.g., be configured such as to be able to focus the light beam, which is reflected from the mirror, on a focal point of the cylindrical reflection grating, i.e. on a position (e.g. a line or a point) in the middle between the cylindrical surface of the reflection grating and the center of curvature of the reflection grating (wherein, for a cylindrical concave mirror, a position in the middle between the mirror surface and the center of curvature can be regarded as focal point in good approximation).

The focusing of the light beam, which is reflected from the mirror towards the reflection grating, on a position "in the vicinity" of the focal point of the reflection grating is to be understood as the focusing of this light beam on a position which is located in the optical path between the mirror and the reflection grating. For example, the reflected light beam may be focused on a position which may be up to ⅕ or up to ½ of the focal length (associated with the focal point of the reflection grating) of the reflection grating apart from the focal point of the reflection grating.

For example, the light beam, which is reflected towards the reflection grating, may be focused on a position in the vicinity of the focal point of the reflection grating which position is located between the mirror and the focal point of the reflection grating, wherein, e.g., during the reflection of the light beam on the (e.g., cylindrical) reflection grating, a (slightly) convergent beam of diffraction light may be produced. As another example, the light beam, which is reflected towards the reflection grating, may be focused on a position in the vicinity of the focal point of the reflection which position is located between the reflection grating and the focal point thereof, wherein, e.g., during the reflection of the light beam on the (e.g., cylindrical) reflection grating, a (slightly) divergent beam of diffraction light may be produced. The focus position of the light beam (e.g. via a corresponding forming of the incoming beam focusing optics) may, e.g., be chosen in such a way that the opening angle of such a convergent or divergent beam of diffraction light comprises an opening angle of less than 5, 10, 20 or 45 degree. The forming of the diffraction light as the convergent or divergent light beam may, e.g., slow down or accelerate the spatial diverging of the individual diffraction reflexes.

The incoming beam focusing optics may, however, also be formed such as to focus the light beam, which runs towards the (curved, e.g. cylindrical) reflection grating, on a position between the light source and the mirror or on a position on the mirror (e.g., on a rotation center, located in the mirror surface, of the object). Furthermore, the incoming beam focusing optics may, e.g., be formed such as to focus the light beam, which runs towards the (curved, e.g. cylindrical) reflection grating, on a position located on the reflection grating or on a position located behind the reflection grating, wherein, in the latter case, the light beam is diffracted by the reflection grating before reaching the focus position. Further, the incoming beam focusing optics may be formed such as to focus the light beam, which runs towards the (curved, e.g., cylindrical) reflection grating, on a position in the infinite, wherein the light beam may impinge onto the reflection grating as a collimated light beam.

According to an embodiment, the incoming beam focusing optics is formed integrally with the optical interference device.

For example, the incoming beam focusing optics may simultaneously form an optical element of the interference device, whereby, e.g., the overall size of the position detector and the number of the required optical elements can be reduced.

According to a further embodiment, the diffraction grating is formed as a reflection grating, wherein the position detector comprises: a beam splitter which is disposed between the light source and the mirror in the optical path of the light beam and which is formed such as to substantially transmit light of a first polarization and to substantially reflect light of a second polarization, and a polarization changing element which is disposed between the reflection grating and the beam splitter in the optical path of the diffraction light and which is formed such as to substantially convert the polarization of the diffraction light to the first polarization or to the second polarization, wherein the beam splitter is disposed and formed such as to direct the diffraction light to the optical interference device. The first polarization is thereby different from the second polarization.

According to this embodiment, the intensity losses of the light on the path from the light source to the interference device can, e.g., be kept low by utilizing the polarization dependency of the beam splitter, and, e.g., a backflow of diffraction light towards the light source can be inhibited.

For example, the light source may be formed in such a way that the light which it produces has the first polarization and thus passes substantially unweakened through the beam splitter on the path towards the mirror in order to thereafter be directed from the mirror onto the diffraction grating, wherein the polarization changing element may, e.g., be formed in such a way that it converts the polarization of the diffraction light produced by the reflection grating to the second polarization and that the diffraction light is thus substantially completely reflected by the beam splitter, wherein the beam splitter may, e.g., be disposed and formed such as to reflect the diffraction light towards the interference device (or towards a part thereof).

As another example, the light source may be formed in such a way that the light which it produces has the second polarization and is thus substantially completely reflected by the beam splitter, wherein the beam splitter may, e.g., be disposed in such a way that it reflects the light beam coming from the light source onto the rotatable mirror and that the light beam is directed onto the reflection grating from the mirror, and wherein the polarization changing element may, e.g., be formed in such a way that it converts the polarization of the diffraction light produced by the reflection grating to the first polarization and that the diffraction light is thus transmitted substantially unweakened by the beam splitter, wherein the beam splitter or the interference device may, e.g., be disposed in such a way that the diffraction light transmitted by the beam splitter runs towards the interference device.

The polarizing beam splitter and the reflection grating may, e.g., be disposed in such a way that the diffraction light runs from the reflection grating (via the polarization changing element) towards the beam splitter, wherein the diffraction light may, e.g., be (again) directed via the mirror. According to such an arrangement, the optical path of the light beam running from the beam splitter towards the reflection grating may substantially coincide with the optical path of the diffraction light running from the reflection grating towards the beam splitter, wherein the polarization changing element may, e.g., be disposed in the optical path between the reflection grating and the beam splitter in such a way that it is passed through by the light beam running towards the reflection grating as well as by the diffraction light. According to such a configuration, the polarization changing element may, e.g., be formed in such a way that the conversion of the polarization of the diffraction light to the first or to the second polarization is effected only by doing such a passing through the same twice, wherein the light may, e.g., adopt a third polarization, which is different from the first and the second polarization, after having passed through the polarization element for the first time (and before the second passing).

The polarization changing element may, e.g., be or comprise a waveplate, e.g. a quarter-wave plate or a half-wave plate, or any other optical element by which the polarization—e.g. the polarization type and/or the polarization direction—of light passing therethrough may be changed.

However, the polarization changing element may also be formed as a polarization filter, wherein, in such a case, the polarization filter, e.g., substantially exclusively transmits light of the first polarization or light of the second polarization and filters out light of other polarizations from the light passing therethrough.

Further, an additional polarization element, e.g. a polarization filter or an additional polarization changing element, may be disposed in the optical path between the light source and the beam splitter, by which element, e.g., the polarization of the light emitted by the light source may be converted to a predetermined polarization before impinging onto the beam splitter or by which element the light of a predetermined polarization may be filtered out from the light emitted by the light source.

According to a further embodiment, the optical interference device comprises an aperture which is formed and disposed such as to (substantially) transmit only the different diffraction orders (intended for producing the interference pattern) of the diffraction light, wherein the optical interference device is further configured such as to direct (e.g. focus) the different diffraction orders of the diffraction light to (on) respectively associated openings of the aperture.

For example, the optical interference device may be configured, e.g. by means of a corresponding focusing optics, such as to be able to direct, e.g. focus, the different diffraction orders to be selected from the entirety of the produced diffraction orders to respectively associated openings of the aperture and to be able to direct, e.g. focus, the remaining diffraction orders to positions on the aperture far from the aperture openings. Thus, it can be ensured that substantially exclusively the diffraction light of the desired different diffraction orders can contribute to the production of the interference pattern. Furthermore, the aperture may, e.g., be formed and disposed (e.g. via corresponding positionings and dimensions of the aperture openings) such as to (substantially) exclusively transmit the desired different diffraction orders of a predetermined wavelength of the diffraction light. The aperture may further be disposed and formed in such a way that the light, which goes out of the respective aperture openings which can act, e.g., as point-shaped or line-shaped light sources depending on the form and size, of the different diffraction orders can interfere behind the aperture, thereby producing the interference pattern.

According to a further embodiment, the optical interference device is configured such as to be able to bring the different diffraction orders of the diffraction light to interference, thereby producing a spatially periodical interference pattern.

The interference pattern produced by the optical interference device may thereby, e.g., be a spatially periodical pattern of bright and dark (e.g. a stripe pattern of bright and dark) in which the brighter portions characterize regions of constructive interference and (in contrast thereto) the darker portions characterize regions of destructive interference of the light of the different diffraction orders, wherein the spatial position of the regions of constructive and destructive interference can be influenced by the phase relationship of the light of the different diffraction orders. A change of this phase relationship with a change of the rotation angle position of the mirror can thus lead to a change of the positions of the bright and the dark portions (i.e. a change in brightness in form of a change of the brightness distribution), thus, e.g., to a spatial displacement of the spatially periodical interference pattern along an associated periodicity direction, and thus to a change of the brightness at certain positions of the interference pattern. In this configuration, the light detector may, e.g., be configured such as to be able to detect such a change in brightness at certain positions of the spatially periodical interference pattern.

According to an embodiment, the detector surface of the light detector comprises a spatially periodical structuring, having the same period as the spatially periodical interference pattern (when impinging onto the detector surface or on the position of the detector surface), of light-sensitive detector surface portions and non-light-sensitive detector surface portions. The light detector may, e.g., be configured such as to be able to detect a change in brightness of the spatially periodical interference pattern (e.g. in form of a spatial displacement and an accompanying change of the brightness distribution of the same).

According to this configuration, the light detector may, e.g., be configured such as to be able to detect the total intensity or total light power of the individual light intensities or individual light powers, which are detected by the individual light-sensitive detector surface portions, as a brightness signal. For example, the dimensions of the light-sensitive detector surface portions may correspond to the dimensions of the bright portions of constructive interference of the spatially periodical interference pattern (when impinging onto the detector surface). During a change of the rotation angle position of the mirror and an accompanying spatial displacement of the bright and the dark portions of the interference pattern, the brightness (total light power) detected by the light detector may thus, e.g., change between a maximum value, which may correspond to a maximum overlapping of the bright portions of the interference pattern with the light-sensitive portions of the detector surface, and a minimum value, which may correspond to a minimum overlapping of the bright portions of the interference pattern with the light-sensitive portions of the detector surface, wherein a cycle of bright and dark of the associated brightness course detected by the light detector may correspond to a displacement of the interference pattern about a period length of the same and wherein an advancement of the reflected light beam on the diffraction grating by a period of the diffraction structure may, e.g., correspond to one or more cycles of bright and dark in the brightness course. The evaluation unit may, e.g., be configured such as to be able to determine a change in the rotation angle position and/or a present rotation angle position, resulting from the same, by evaluating the number of cycles of bright and dark in such a brightness course and/or the form of the brightness course. The evaluation unit may, e.g., be further configured such as to be able to evaluate the brightness course (or the form thereof) by means of an interpolation method, whereby the detectable angle resolution may, e.g., be substantially better than the rotation angle or the change in rotation angle which corresponds to a cycle of bright and dark in such a brightness course.

According to a further embodiment, the optical interference device further comprises a mask which comprises a spatially periodical structure of (substantially) light-transmissive portions and (substantially) opaque portions and which is disposed such as to be able to produce a spatially periodical Moiré interference pattern on a detector surface of the light detector via superposition of the spatially periodical structure of the mask with the spatially periodical interference pattern. The light detector may, e.g., be configured such as to be able to detect a change in brightness of the Moiré interference pattern.

During superposing two periodical patterns, wherein the patterns comprise, e.g., structures of slightly different period lengths and/or are twisted with respect to each other, patterns having a (substantially) greater period length than that of the initial patterns may be generated, wherein this effect is known as the Moiré effect and the resulting pattern is known as a Moiré pattern. E.g., a resulting, spatially periodical Moiré pattern, which is in the following referred to as Moiré interference pattern, having a greater period length than that of the interference pattern may thus be produced from the spatially periodical interference pattern, which is produced by the optical interference device, via superposition with the spatially periodical structure of the mask.

The detection and evaluation of the Moiré interference pattern may, e.g., be carried out similarly to the above described detection and evaluation of the spatially periodical interference pattern, which is produced by the optical interference device, wherein, however, e.g., light detectors having light-sensitive detector portions of larger scale may be used during the detection of the Moiré interference pattern because of the greater period length compared to the periodical interference pattern.

According to an embodiment, a detector surface of the light detector comprises a spatially periodical structuring, having the same period as the Moiré interference pattern (when impinging onto the detector surface or on the position of the detector surface), of light-sensitive detector surface portions and non-light-sensitive detector surface portions.

According to this configuration, the light detector may, e.g., be configured such as to be able to detect the total intensity or total light power of the individual light intensities or individual light powers, which are detected by the individual light-sensitive detector surface portions, as a brightness signal. For example, the dimensions of the light-sensitive detector surface portions may correspond to the dimensions of the bright portions of the Moiré interference pattern (when impinging onto the detector surface). During a change of the rotation angle position of the mirror and an accompanying spatial displacement of the bright and the dark portions of the Moiré interference pattern, the brightness detected by the light detector may, e.g., thus change, in an analogous manner to the above described case, between a maximum value and a minimum value, wherein a cycle of bright and dark of the associated brightness course detected by the light detector may correspond to a displacement of the Moiré interference pattern about a period length of the same. The evaluation unit may, e.g., be configured such as to be able to determine a change in rotation angle position and/or a present rotation angle position, resulting from the same, by evaluating the number of cycles of bright and dark in such a brightness course and/or the form of the brightness course.

According to the above described configurations, the light detector may be configured such as to be able to detect multiple periods of bright and dark of the spatially periodical intensity pattern or of the Moiré interference pattern. However, the light detector may also be configured such as to merely be able to detect a change in brightness of a single period of the respective interference pattern. For example, the dimensions of the detector surface of the light detector may substantially correspond to the dimensions of a single bright portion of the spatially periodical intensity pattern or of the Moiré interference pattern, wherein the light detector may, e.g., be configured such as to detect the light power, which impinges on this detector surface, as a brightness signal.

According to a further embodiment, the optical interference device is configured such as to bring the different diffraction orders of the diffraction light to superposition (and thus to interference) on a common position on the light detector (e.g. such as to focus the different diffraction orders of the diffraction light on a common position on the light detector to superposition), thereby producing an interference pattern which comprises a total brightness which varies with the rotation angle position (of the mirror or of the rotatably supported object).

The interference pattern produced by the optical interference device may thereby be produced via directly superposing the diffraction reflexes of the different diffraction orders on the common position, wherein the total intensity interference pattern produced this way may be given at the common position by the brightness or total light intensity being resulted (from the interference of the light of the different diffraction orders). According to this configuration, it may, e.g., be envisaged (e.g. by correspondingly designing the interference device) that the light of the different diffraction orders initially runs on separate optical paths to the light detector and superposes only at the common position on the light detector and is thus brought to interference, or it can be envisaged that the light of the different diffraction orders gets already superposed at a position before the impingement on the light detector and then runs along a common optical path or light path towards the light detector. In this configuration, the light detector may, e.g., be configured such as to be able to detect the total light intensity. A change of the phase relationships of the light of the different diffraction orders with a change of the rotation angle position of the mirror may lead to a change, e.g. a reduction or increase, of the resulting total light intensity or total brightness of the interference pattern, wherein this change in brightness and the associated brightness course can be detected by the light detector. With the reflected light beam passing over the grating, the total light intensity may thereby, e.g., (periodically) change between a maximum value, which corresponds to a substantially constructive interference of the different diffraction orders, and a minimum value, which corresponds to a substantially destructive interference of the different diffraction orders, wherein the advancement of the reflected light beam on the diffraction grating by a period of the diffraction structure may, e.g., correspond to one or more cycles of bright and dark in the brightness course. The evaluation unit may, e.g., be configured such as to be able to determine the change in the rotation angle position and/or a present rotation angle position, resulting from the same, by evaluating the number of the cycles of bright and dark in such a brightness course and/or the form of the brightness course.

According to the above described embodiments, the evaluation unit may, e.g., be configured such as to be able to determine a change in the rotation angle in its absolute value from the brightness course detected by means of the respective light detectors. The position detector may further, e.g., comprise a rotation direction detector which is configured such as to be able to detect a rotation direction signal by means of which the direction of the change in rotation angle (i.e. the associated rotation direction) can be detected. For example, the rotation direction detector may be connected with the evaluation unit and the evaluation unit may be configured such as to be able to determine the rotation direction based on the rotation direction signal.

As the rotation direction detector, e.g., a reference light detector may be provided which is disposed and configured such as to be able to detect (in an analogous manner to the respective light detector) a change in brightness, which is caused by said passing over of the diffraction grating with the reflected light beam, of the interference pattern as well as a reference brightness course comprising the change in brightness, wherein the position detector and/or the respective reference light detector may further be disposed and configured in such a way that the reference brightness course is phase shifted with respect to the brightness course detected by the light detector, and wherein the evaluation unit may, e.g., be further configured such as to be able to determine a rotation direction, which is associated with a respective change in the rotation angle, of the object or of the mirror based on the phase shift of both brightness courses.

According to an embodiment, the different diffraction orders (selected by means of the optical interference device) are the plus first diffraction order and the minus first diffraction order.

For example, the optical interference device may be configured such as to select only the diffraction reflexes of plus first and minus first diffraction order from the entirety of the diffraction reflexes produced by the diffraction grating and such as to bring only them to interference, thereby producing the interference pattern. For example, the plus first and minus first diffraction orders may comprise a high light intensity relative to the diffraction reflexes of higher order and thus, e.g., allow producing an interference pattern which is rich of contrast and strong in radiance, respectively.

According to a further embodiment, the position detector further comprises a reference position light detector which is disposed such as to be passed over by a partial beam, reflected from the mirror, of the light beam during a rotation of the mirror and which is configured such as to be able to detect a reference position brightness course caused by said passing over, wherein the evaluation unit is further connected with the reference position light detector and is configured such as to be able to determine a reference rotation angle position of the object from the reference position brightness course.

The reference position light detector may, e.g., serve for determining an absolute zero point or reference point or reference rotation angle of the mirror with respect to which an absolute rotation angle position of the mirror (and thus also of the rotatably supported object) can then be determined by the evaluation unit. For example, the evaluation unit may be configured such as to be able to determine the absolute rotation angle position of the mirror by being able to determine changes in rotation angle—e.g. as described above—from the brightness course detected by the light detector and by being able to add up these changes in rotation angle, starting from the reference rotation angle, with regard to the direction. Furthermore, the evaluation unit may, e.g., be configured such as to be able to find or determine a certain period (or a certain cycle of bright and dark) in the brightness course detected by the light detector, wherein, in such a case, e.g., a reference position light detector having a correspondingly lower accuracy may be provided.

For example, the reference position light detector may be disposed in the optical path of the light beam, which is reflected from the mirror towards the diffraction grating, (e.g. between the mirror and the diffraction grating) such as to be passed over by a part of the reflected light beam during a rotation of the mirror. The reference position light detector may further, e.g., be configured and disposed in such a way that the reference position brightness course comprises a brightness extremum (e.g. a maximum or a minimum) or another characteristic when the mirror is located in the reference rotation angle position, wherein the evaluation unit may, e.g., be configured such as to be able to determine the reference rotation angle position based on the location of such an extremum or characteristic from the reference position brightness course.

According to an embodiment, the position detector further comprises a partial beam outcoupling device which is disposed between the light source and the mirror in the optical path of the light beam and which is configured such as to couple the partial beam out and to direct it to the mirror at an angle relative to the light beam (which runs from the light source towards the mirror) in such a way that it passes over the reference position light detector during a rotation of the mirror.

According to this embodiment, the reference position light detector may, e.g., be disposed outside of the optical path of the light beam reflected from the mirror to the diffraction grating. For example, the partial beam outcoupling device may comprise an outcoupling diffraction grating which is configured and is disposed between the light source and the mirror such as to deflect a part of the light beam coming from the light source as a partial beam at an angle with respect to the incident light beam. However, e.g., a partially transmissive outcoupling mirror or another optical element for outcoupling the partial beam may also be provided.

According to a further embodiment, the reference position light detector is disposed at a focal point of the incoming beam focusing optics (wherein the term "focal point" is also correspondingly used for "focal line", i.e. correspondingly characterizes here a focus or a focus position of the incoming beam focusing optics).

According to this embodiment, the incoming beam focusing optics may, e.g., be further disposed and configured such as to focus the partial beam which is reflected at the mirror on an associated focus position. The incoming beam focusing optics can thereby be provided for both focusing the light beam which is reflected towards the diffraction grating and focusing the partial beam which is reflected towards the reference position light detector. The reference position light detector may, e.g., be disposed at the focus position of the partial beam such that, e.g., no additional optical elements for positioning or focusing of that partial beam have to be provided.

According to a further embodiment of the invention, a light deflection device is provided having a rotatably disposed working beam deflection mirror for deflecting a working light beam, and a position detector for determining the rotation angle position of the working beam deflection mirror, comprising: a light source for producing a light beam, a diffraction grating, a mirror which is connected to the working beam deflection mirror in such a way that it co-rotates with the working beam deflection mirror during a rotation of the working beam deflection mirror and which is disposed in such way that the light beam is reflected therefrom onto the diffraction grating and that, during a rotation of the mirror, the reflected light beam passes over the diffraction grating according to the rotation, wherein the light of the reflected light beam is diffracted by the diffraction grating, thereby producing diffraction light, an optical interference device which is disposed in the optical path of the diffraction light and is configured such as to be able to bring different diffraction orders ($m=-1$, $m=+1$) of the diffraction light to interference, thereby producing an interference pattern, a light detector which is disposed and configured such as to be able to detect a change in brightness of the interference pattern, which is caused by said passing over of the diffraction grating with the reflected light beam, as well as a brightness course comprising the change in brightness, and an evaluation unit which is connected with the light detector and is configured such as to be able to determine the rotation angle position of the working beam deflection mirror based on the brightness course.

BRIEF DESCRIPTION OF THE DRAWINGS

In the following, the invention will be explained by embodiments with reference to the accompanying drawings, wherein, in the drawings, the same or similar parts are designated by the same reference signs.

In the drawings.

DETAILED DESCRIPTION OF THE INVENTIONS

Figure 1:
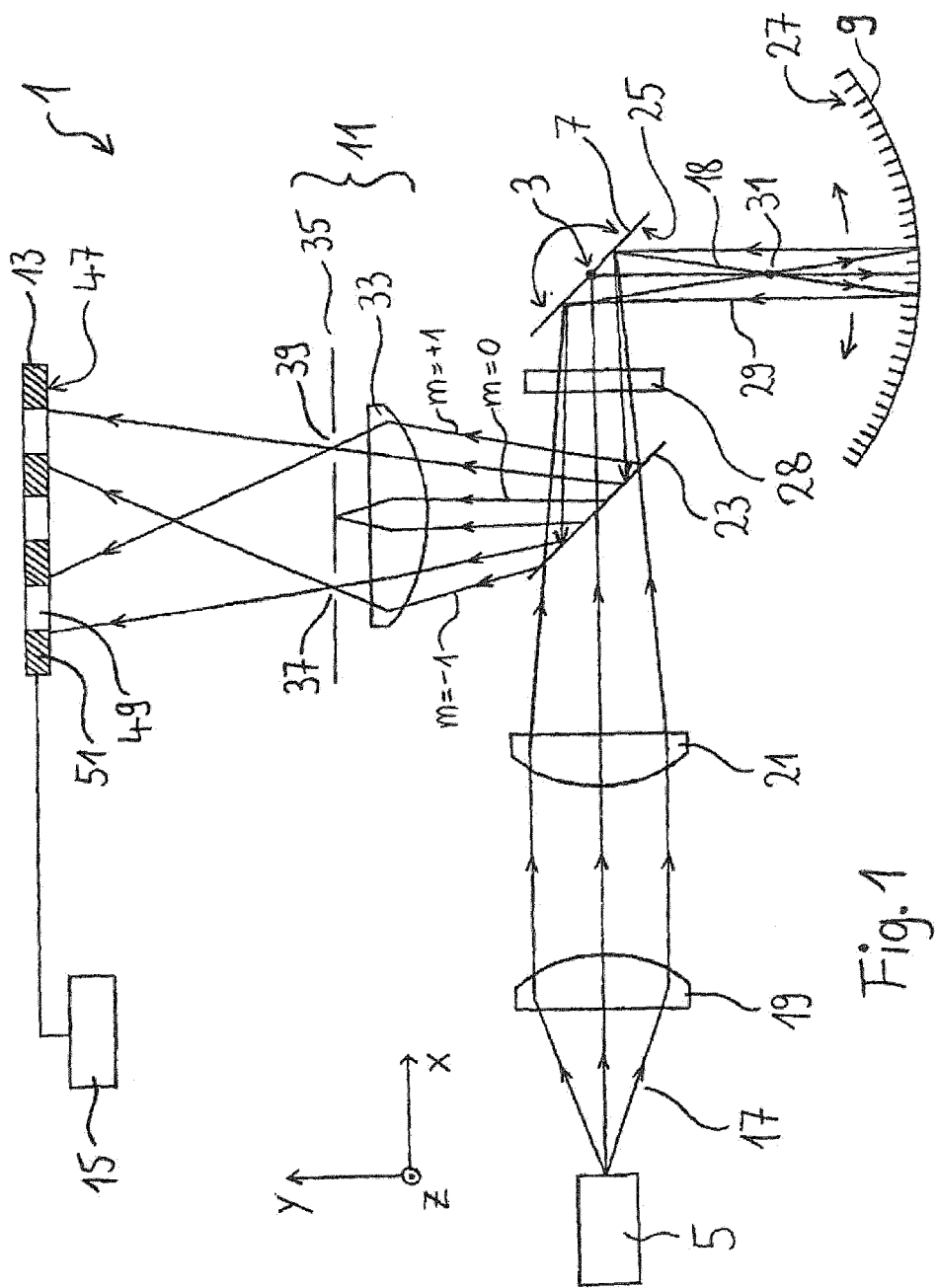
FIG. 1 shows a schematic top view of a position detector according to an embodiment of the invention.

FIG. 1 illustrates a position detector 1 according to an embodiment, wherein the position detector 1 is provided for determining the rotation angle position of a shaft which extends along the z-direction of the xyz-coordinate system shown in FIG. 1 (i.e. vertical to the drawing plane of FIG. 1) and which is rotatably disposed about its longitudinal axis and which, e.g., may function as the shaft of a light deflection device (e.g. of a galvanometer scanner).

According to FIG. 1, the position detector 1 comprises a light source in form of a laser diode 5, a rotatably disposed mirror 7, a diffraction grating 9, an optical interference device 11, a light detector 13 as well as an evaluation device 15. The laser diode 5 emits a laser light beam 17 comprising laser light of a corresponding wave length. The laser beam or light beam 17 is collimated by means of a collimation optics, here formed as a collimation lens 19, and is directed via an incoming beam focusing optics, here formed as a cylindrical lens 21, onto the mirror 7, wherein the light beam 17 passes through a beam splitter 23 and a polarization changing element 28.

The mirror 7 is realized as a plane mirror and is connected to the shaft 3, e.g. attached to an axial end of the shaft 3, in such a way that the (elongated) longitudinal axis or rotation axis of the shaft 3 extends in a mirror surface 25 of the mirror 7 and that, during a rotation of the shaft 3, the mirror 7 co-rotates with the same. The mirror may also be formed integrally with the shaft 3, wherein, e.g., a surface of the shaft 3 may be formed as a mirror surface.

In the configuration according to FIG. 1, the diffraction grating 9 is realized as a reflection grating 9 which faces towards the mirror 7 with its concavity and which is disposed concentrically to the rotation axis of the shaft 3, i.e. concentrically to the shaft 3. The reflection grating 9 comprises a diffraction structure 27 which is periodical along the circumference direction of the cylindrical grating 9 and which here consists of, e.g., an arrangement of diffraction structures, e.g. in form of webs, which are equidistant and which are extending along the z-direction and which are parallel to each other (illustrated in a simplifying manner in FIG. 1 by the line graduation 27 of the reflection grating 9).

The diffraction grating 9 and the mirror 7 are disposed in such a way that the light beam 17 coming from the laser diode 5 is reflected from the mirror 7 onto the diffraction grating 9, thereby forming a reflected light beam 18, and that, during a rotation of the mirror 7, the reflected light beam 18 passes over the diffraction grating 9 according to the rotation parallel to the circumferential direction of the cylindrical grating 9, i.e. parallel to the periodicity direction of the diffraction structure 27 or vertically to the extension direction of the diffraction structure elements of the diffraction structure 27.

The light of the reflected light beam 18 is diffracted in reflection by the reflection grating 9, thereby producing diffraction light 29, wherein the diffraction light 29 may comprise light of any diffraction orders and is reflected from the reflection grating 9 towards the mirror 7.

In the configuration according to FIG. 1, the incoming beam focusing optics which is disposed between the laser diode 5 and the mirror 7 in the optical path of the light beam 17 is formed in form of the cylindrical lens 21 and disposed such as to focus the light beam 17 or the light beam 18, which is reflected from the mirror 7 towards the reflection grating 9, substantially on a line-shaped focal point or a focal line 31 of the cylindrical reflection grating 9 (i.e. on a focal line, which extends along the z-direction, in the middle between the reflection grating 9 and the curvature center of the grating 9 which center is here given by the rotation axis of the shaft 3). The diffraction light 29 which is diffracted in reflection by the reflection grating 9 thus runs in form of a substantially collimated diffraction light beam 29 (taking into account the divergence of the individual diffraction reflexes) in the direction towards the mirror 7 and is reflected from the mirror 7 onto the beam splitter 23. However, the incoming beam focusing optics 21 may also be formed such as to focus the reflected light beam 18 on a position in the vicinity of the focal line 31 (i.e. on a position aside of the focal line 31) such that the diffraction light 29 runs toward the mirror 7 in form of a (slightly) convergent or divergent diffraction light beam 29.

Furthermore, the mirror 7 is disposed in such a way that the light beam 17 (or a central main beam of the light beam 17) impinges onto the mirror surface 25 substantially on a central position which is located on the (virtual) intersection line of the rotation axis of the shaft 3 with the mirror surface 25, wherein the line-shaped focus of the reflected light beam 18 substantially passes over a corresponding circular path or circular focus trajectory during a rotation of the mirror 7.

The beam splitter 23 is formed and disposed such as to be able to couple at least a part of the diffraction light 29 out, i.e. to deflect at least a part of the diffraction light 29 at an angle relative to the light beam 17 which comes from the laser diode 5, and to direct it to the optical interference device 11 or the interference optics 11 of the position detector 1, wherein the diffraction reflexes, which runs out of the beam splitter 23, of the respective orders diverge spatially. In FIG. 1, only the diffraction reflexes, which runs out of the beam splitter, of the zero order (m=0), of the minus first (m=−1) and plus first (m=+1) orders are depicted by their respective boundary beams for better illustration.

In the configuration according to FIG. 1, the beam splitter 23 is a polarization-sensitive or polarizing beam splitter 23 which is formed such as to substantially transmit light of a first polarization, e.g. here light which is linearly polarized in the y-direction, and to substantially reflect light of a second polarization (which is different from the first polarization), e.g. here light which is linearly polarized in the z-direction. According to this configuration, the beam splitter 23 is thus substantially a polarization-sensitive outcoupling mirror 23.

Furthermore, in the configuration according to FIG. 1, the light source 5 is formed in such a way that the light 17 which it produces comprises the first polarization, thus the light beam 17 is linearly polarized in the y-direction. The light source may also be formed in such a way that the light which it produces comprises a polarization which is different from the first polarization, wherein, in this case, e.g., an optical element (not shown in FIG. 1), e.g. a waveplate or λ/n-plate, may be provided in the optical path between the light source and the beam splitter, which element is formed such as to convert the polarization of the light beam 17 to the first polarization before impinging onto the beam splitter 23. The light beam 17 coming from the light source 5 is thus substantially completely (i.e. without loss of intensity) transmitted by the beam splitter 23.

The polarization changing element 28 is disposed in the optical path between the beam splitter 23 and the reflection grating 9 such as to be passed by the light beam 17 running towards the reflection grating 9 as well as by the diffraction light 29 (in the reversed direction). In the configuration according to FIG. 1, the polarization element 28 is, as an example, a quarter-wave plate by which the light which comes from the beam splitter 23 and which is linearly polarized in the y-direction is converted to circularly polarized light which is diffracted in reflection at the grating 9. The diffraction light 29, which comes from the diffraction grating 9 and which is circularly polarized, in turn passes through the quarter-wave plate in the reversed direction on its way to the beam splitter 23, wherein the circularly polarized diffraction light 29 is converted to diffraction light 29 which is linearly polarized along the z-direction, i.e. is converted to the second polarization. According to the present configuration, the polarization element 28 is thus formed such as to initially convert the light, which comes from the light source 5, of the first polarization (during passing through the polarization changing element 28 one-time) to a third polarization (being different from the first and the second) and such as to then convert it from the third to the second polarization (during passing through the polarization changing element 28 a second time). The polarization element 28 is thus formed such as to convert the polarization of the diffraction light 29 to the second polarization and in such a way that thus the diffraction light 29 is now substantially completely (i.e. without loss of intensity) reflected from the beam splitter 23 towards the interference device 11.

However, the position detector 1 may also be realized without the polarization changing element 28, wherein, in such a case, the light source 5 may, e.g., emit light having any polarization properties and the beam splitter 23 may, e.g., be a polarization-independent beam splitter.

According to the configuration shown in FIG. 1, the interference device 11 comprises a focusing optics, here formed as a focusing lens 33 (e.g. here in form of a cylindrical lens), and an aperture (diaphragm), here formed as an aperture slot (slit diaphragm) 35.

The focusing lens 33 and the aperture slot 35 are disposed in such a way that the diffraction light of the minus first and plus first diffraction orders is focused on respectively associated slot openings 37, 39 of the aperture slot 35 by the focusing lens 33, wherein the aperture slot 35 is formed and disposed (parallel to the xz-plane of the xyz-coordinate system) such as to transmit only the diffraction light of the minus first and plus first diffraction orders of the diffraction light, whereas the remaining diffraction orders are blocked, i.e. masked, by the aperture slot 35. For example, the focusing lens 33 may be formed such as to focus the diffraction light of the zero order (m=0) on a position in the middle between the two slot openings 37, 39 onto the aperture slot 35 and thus to mask it (see FIG. 1).

Figure 2:
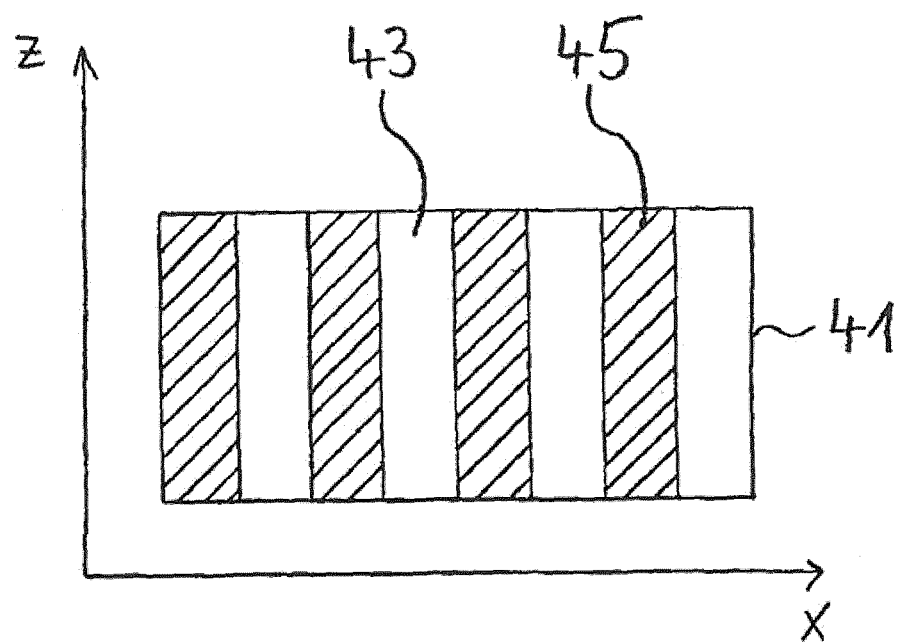
FIG. 2 shows a schematic illustration of a spatially periodical interference pattern for explaining the mode of operation of the position detector shown in FIG. 1, FIG. 3 show a schematic illustration for explaining a change in brightness of the interference pattern shown in FIG. 2.

The light, which runs out of the both slot openings 37, 39, of the diffraction reflexes of the minus first (m=−1) and plus first (m=+1) diffraction orders interferes behind the aperture slot 25 at the location of the detector 13, as illustrated in FIG. 2, thereby producing a spatially periodical stripe-shaped interference pattern 41 of bright stripes 43 (i.e. stripes of higher light intensity) and dark stripes 45 (i.e. stripes of lower light intensity) which extend parallel to the z-direction, wherein the bright stripes 43 correspond to regions of constructive interference and the dark stripes 45 correspond to regions of destructive interference of the light of the plus first and minus first orders. The stripe-shaped interference pattern 41 thus comprises, as illustrated in FIG. 2, a stripe pattern of bright and dark which is periodical along the x-direction of the xyz-coordinate system (wherein, in FIG. 2, an abrupt transition of bright and dark between the individual stripes is depicted for better illustration, whereas this transition is in fact fluent as can be seen, e.g., from the intensity distribution according to FIG. 3).

In the illustration according to FIG. 1, the divergence of the light of a respective diffraction reflex (here: m=±1), which is transmitted by the aperture 35, behind the aperture 35 (i.e. after passing through the aperture 35) is equal to the divergence in front of the aperture 35 after passing through the focusing lens 33. This may, e.g., be the case if the smallest dimension of the aperture openings 37, 39 (e.g. the slot width of the slot openings 37, 39) is such big (e.g. greater than the wavelength of the diffraction light) that the diffraction effects at the aperture 35 can be neglected or do not even occur. However, a dimension of the aperture openings 37, 39 (e.g. the slot width of the slot openings 37, 39) may also be selected in such a way (e.g. smaller than the wavelength of the diffraction light) that the openings of the picture 35 act as point- or line-shaped light sources, wherein the divergence of the light of a respective diffraction reflex behind the aperture 35 may be larger than the divergence in front of the aperture 35 because of the then occurring diffraction effects. Such a design may, e.g., allow for a smaller distance between the aperture 35 and the light detector 13 and thus for a reduced overall size of the position detector 1.

Figure 3:
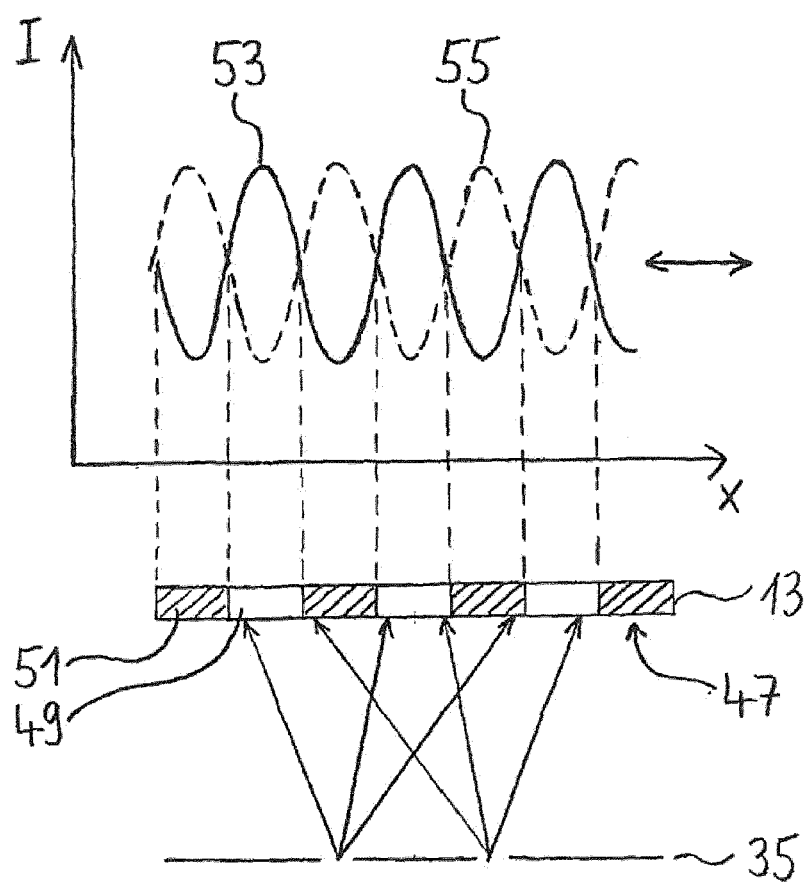

The light detector 13 is disposed and configured such as to be able to detect a change of the spatial brightness distribution of the stripe-shaped interference pattern 41 as a change in brightness, wherein the total width (in x-direction) of the light detector 13 may, e.g., be at adapted to the total width (in x-direction) of the interference pattern 41. As illustrated in FIG. 3, the light detector 13 comprises a detector surface 47 which is disposed parallel to the xz-plane of the xyz-coordinate system and which comprises a stripe-shaped structuring, which is periodical along the x-direction, of light-sensitive detector surface portions 49 (not shaded), which extend along the z-direction, and non-light-sensitive detector surface portions (shaded), wherein the structuring of the detector surface 47 comprises the same period as the interference pattern 41 (which is also periodical along the x-direction) when impinging onto the detector surface 47, and wherein the width of the light-sensitive detector surface portions 49 (in x-direction) corresponds to the width of the bright stripes 43 of the interference pattern 41 when impinging onto the detector surface 47. The width of the stripes 43, 45 of the interference pattern 41 on the detector surface 47 may, e.g., depend on the distance of the detector surface 47 from the aperture slot 35. The light detector 13 is configured such as to detect the total light power P, i.e. the sum of the individual light powers detected by the individual light-sensitive detector surface portions 49, as a brightness signal.

FIG. 3 explains schematically the mode of operation of the present embodiment by means of the intensity distribution generated by the stripe-shaped interference pattern 41 on the detector surface 47, wherein the upper part of FIG. 3 illustrates the variation of the light intensity I on the detector surface 47 with the x-position. The position (in x-direction) of the bright stripes 43 and of the dark stripes 45 of the interference pattern 41 on the detector surface 47 depends on the phase relationship or phase difference of the light, which runs out of the slot openings 37, 39, of the plus first and minus first diffraction orders. A rotation of the mirror 7 leads to a change of the phase relationship of these two diffraction orders via the accompanying change in position of the light beam 17, which is reflected by the mirror 7, on the reflection grating 9 and thus to a displacement of the stripe-shaped interference or intensity pattern 41 on the detector surface 47 along the periodicity direction thereof, i.e. along the x-direction (illustrated in FIG. 3 by the double arrow), wherein the total brightness of the interference pattern 41 may, e.g., be constant. The degree of the overlapping of the bright stripes 43 of the interference pattern 41 with the light-sensitive detector surface portions 49 thereby varies, and thus also the total light power P detected by the light detector 47. Because of the coincident structures of the interference pattern 41 and of the detector surface 47, a maximum overlapping of the bright stripes 43 of high light intensity I of the interference pattern 41 with the light-sensitive detector surface portions 49, depicted in FIG. 3 by the solid intensity distribution 53, thereby corresponds to a maximum value Pmax of the total light power P detected by the light detector 13, whereas a maximum overlapping of the dark stripes 45 of low light intensity I of the interference pattern 41 with the light-sensitive detector surface portions 49, depicted in FIG. 3 by the dashed intensity distribution 55, corresponds to a minimum value Pmin of the power P.

During a rotation of the mirror 7, the light power P detected by the light detector 13 thereby varies between the minimum value Pmin and the maximum value Pmax, wherein this change in brightness as well as a corresponding brightness course are detected by the light detector 13, wherein the light detector 13 may, e.g., initially detect a brightness-time-course.

Figure 4:
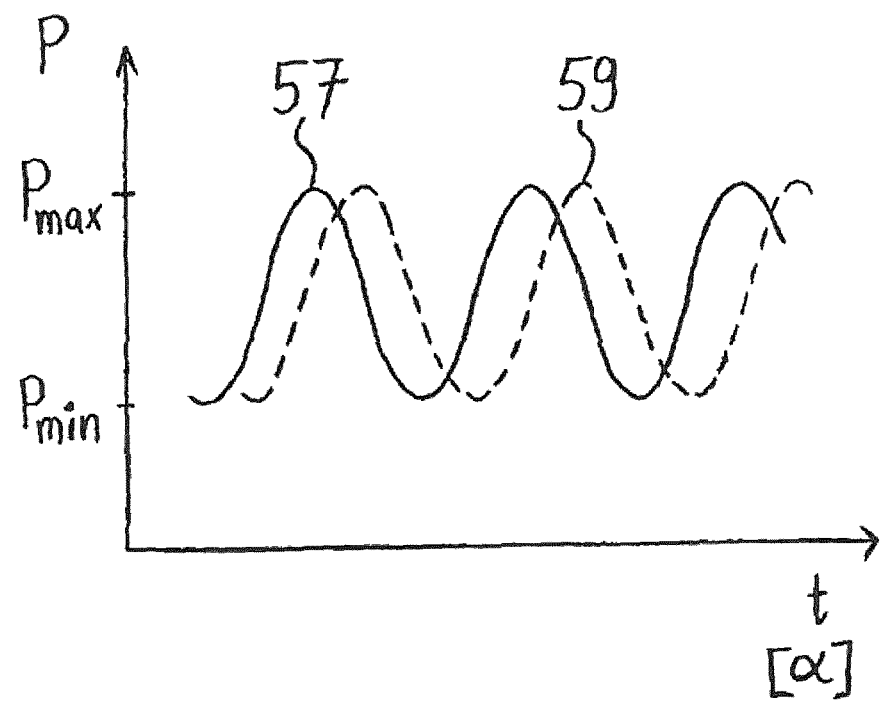
FIG. 4 shows an illustration of a brightness course and of a reference brightness course for explaining the mode of operation of the position detector shown in FIG. 1.

FIG. 4 shows as an example a brightness course 57 when rotating the mirror 7, wherein the horizontal axis indicates the time t, and wherein the total light power P detected by the light detector 13 is plotted as a brightness signal on the vertical axis. At constant rotation speed of the mirror 7, the brightness signal detected by the light detector 13 is periodical with the time as illustrated in FIG. 4, resulting in a wave-like or sinusoidal brightness course. The time dependency of the total light power P detected by the light detector 13 may, e.g., be converted into a rotation angle dependency of the total light power P by means of the evaluation unit 15, wherein the detected light power P varies periodically with the rotation angle α of the mirror 7, what is indicated in FIG. 4 by the parenthesized identifier α of the horizontal axis.

The evaluation unit 15 is connected with the light detector 13 and is configured such as to be able to determine the rotation angle position of the mirror 7 and thus also of the shaft 3 based on the brightness course 57. For example, the evaluation unit 15 may be configured such as to be able to determine the associated change in rotation angle, e.g. in its absolute value, via counting or via evaluating the number of the cycles of bright and dark in the brightness course 57 and/or the form of the brightness course 57, wherein the position detector 1 may, e.g., comprise a rotation direction detector (not shown) for determining the associated rotation direction. The rotation direction detector may, e.g., be connected with the evaluation unit 15 and be configured such as to be able to detect the respective rotation direction, wherein the evaluation unit 15 may further be configured such as to be able to determine a change in rotation angle, which is provided with an algebraic sign or a rotation direction, based on the brightness course 57 detected by the light detector 13 and on the rotation direction detected by the rotation direction detector.

The rotation direction detector may, e.g., be realized in form of a reference light detector (not shown) which is formed in an analogous manner to the light detector 13 (i.e., e.g., which also comprises a structuring, which has the same period as the interference pattern 41, having stripe-shaped light-sensitive detector surface portions and non-light-sensitive detector surface portions), wherein the structuring of the reference light detector is, however, displaced along the periodicity direction of the structuring (i.e. here along the x-direction), e.g. by a quarter period, with respect to the structuring of the light detector 13. The reference brightness course 59 detected by the reference light detector is then phase shifted or time shifted with respect to the brightness course 57, resulting in periodical brightness courses 57, 59, which are phase shifted with respect to each other by a quarter period (see FIG. 4), at constant rotation speed of the mirror 7 and at a displacement of the structuring of the two light detectors by a quarter period. The evaluation unit 15 may, e.g., be connected with the reference light detector and be configured such as to be able to determine the rotation direction (associated with a change in rotation angle) from the phase relationship between the brightness course 57 and the reference brightness course 59.

Fox example, when the present rotation angle corresponds to a flank position of the brightness signal 57, the rotation direction can be unambiguously determinable solely by means of the brightness course 57, which is detected by the light detector 13, by being able to assign an increase of the brightness to a certain rotation direction and a decrease of the brightness to the opposite rotation direction. However, when the present rotation angle corresponds to a maximum or a minimum of the brightness course 57, the algebraic sign of the change in brightness is independent from the rotation direction such that the rotation direction cannot be unambiguously determined by means of the brightness course 57. In such a case, the rotation direction may, however, e.g., be determined by means of the phase shifted reference brightness course 59 since an extremum of the brightness course 57 always corresponds to a flank of the reference brightness course 59.

The mode of operation explained by means of the configuration according to FIG. 1 may also be realized with other optical elements or with other arrangements and combinations of optical elements than shown in FIG. 1. For example, the different optical paths may be folded or deflected using deflection mirrors or the optical components may be formed (at least partially) integrally with each other, wherein, e.g., functionality of multiple optical elements may be integrated in a single optical element, whereby, e.g., the overall size of the position detector may be reduced.

Figure 5:
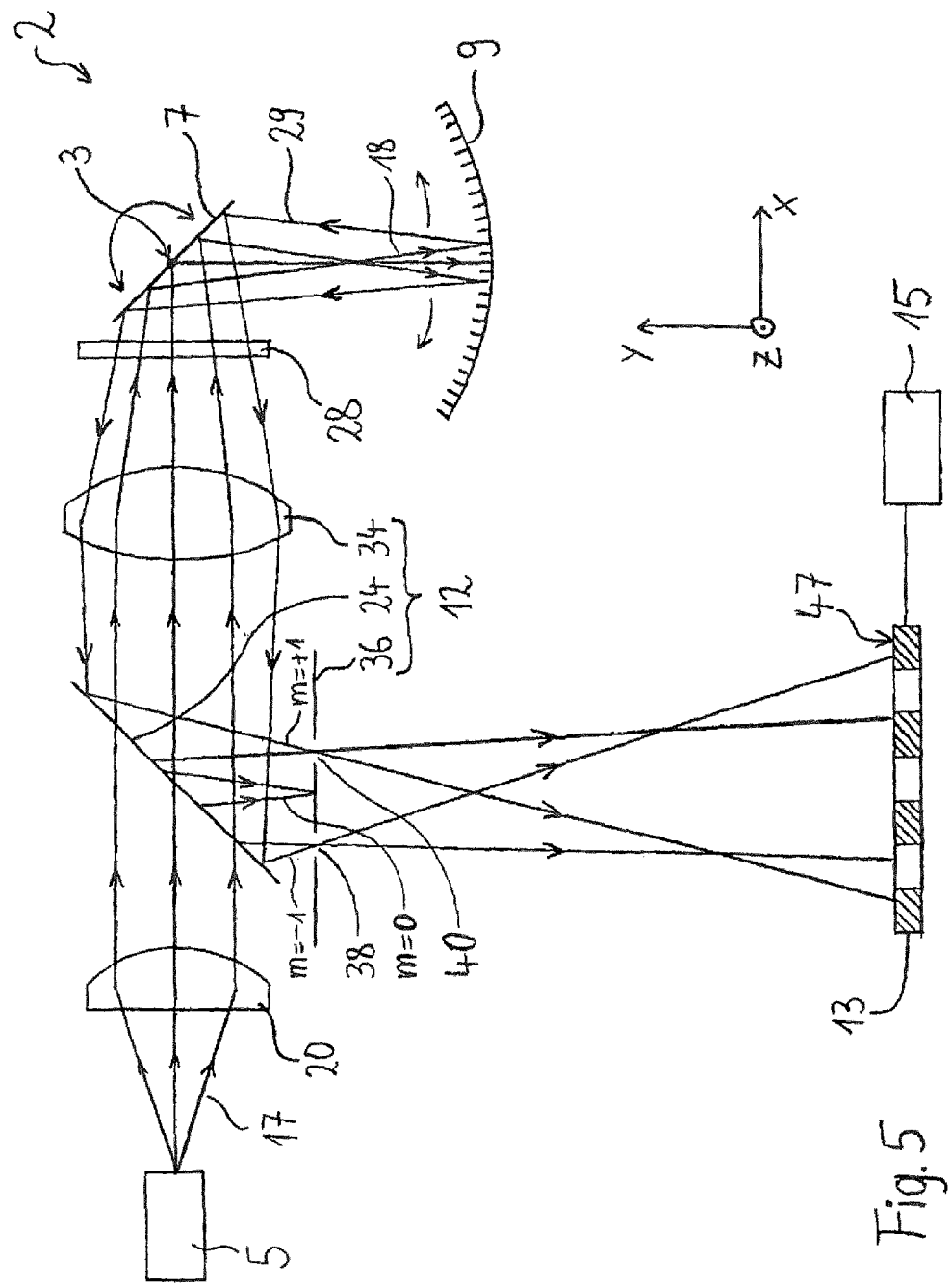
FIG. 5 shows a schematic top view of a position detector according to another embodiment.

As an example, FIG. 5 illustrates a position detector 2 according to another embodiment, wherein facts, which have already been explained with respect to FIG. 1 and which apply to the embodiment according to FIG. 5 in an analogous manner, are not again explained completely in the following explanation.

According to FIG. 5, a conically diverging light beam 17 is initially emitted by the light source 5 which is in form of a laser diode 5, which beam propagates in x-direction and comprises a divergence with respect to the y-direction as well as a divergence with respect to the z-direction. The light beam 17 is initially collimated by means of a collimation optics 20, here formed as a cylindrical lens 20, in such a way that the divergence of the light beam 17 with respect to the y-direction is eliminated, that the light beam 17 is thus collimated in a plane, which extends parallel to the xy-plane, after passing through the collimation optics 20, wherein, however, (because of the asymmetry of the cylindrical lens 20) the divergence of the light beam 17 with respect to the z-direction remains, the light beam 17 thus still diverges in a plane which extends parallel to the xz-plane.

The light beam 17, which is partially collimated in this way, passes through a beam splitter 24 and is directed onto the rotatably disposed mirror 7 via an incoming beam focusing optics, here formed as spherical lens 34, and via the polarization changing element 28 such that the reflected light beam 18 runs in the direction towards the diffraction grating 9. The incoming beam focusing optics or spherical lens 34 is formed such as to eliminate the divergence of the light beam 17 in z-direction (that the light beam 17 is thus collimated with respect to the z-direction after passing through the spherical lens 34) and to focus the light beam 17 or the reflected light beam 18 in a plane, which is extending parallel to the xy-plane, on a focal point or a focal line (not shown in FIG. 5) of the cylindrical reflection grating 9 or towards the vicinity of this focal point or this focal line. In the embodiment according to FIG. 5, the light beam 17 is focused on a position in the vicinity of the focal point, which position is located on the side, which faces towards the diffraction grating or reflection grating 9, of this focal point, such that the diffraction light 29, which is diffracted in reflection by the reflection grating 9, runs in the direction towards the mirror 7 in form of a (slightly) diverging—in a plane extending parallel to the xy-plane—diffraction light beam 29 and is again reflected from the mirror 7 via the polarization changing element 28 towards the incoming beam focusing optics 34 which is in form of the spherical lens 34, wherein the diffraction reflexes of the respective orders diverge spatially. The incoming beam focusing optics 34 may also be formed such as to focus the reflected light beam 18 on the focal line of the reflection grating such that the diffraction light 29 runs towards the mirror 7 in form of a completely collimated diffraction light beam 29 (i.e. being collimated with respect to both direction components which extend vertically to its direction of propagation).

The beam splitter 24 is formed and disposed such as to couple at least a part of the diffraction light 29 out after the passing through of the incoming beam focusing optics 34 and to direct it in the direction towards an aperture (diaphragm) (here: aperture slot (slit diaphragm)) 36, wherein the incoming beam focusing optics 34 and the aperture 36 are further formed and disposed in such a way that the diffraction reflexes, which are provided for producing the interference pattern, are focused by the incoming beam focusing optics 34 on corresponding openings (here: slot openings) 38, 40 of the aperture slot 36 and are thus transmitted by the aperture 36, whereas the remaining diffraction reflexes are blocked by the aperture slot 36. In an analogous manner to the configuration according to FIG. 1, only the diffraction reflexes of the zero (m=0), minus first (m=−1) and plus first (m=+1) orders are illustrated by their respective boundary beams in FIG. 5, wherein, according to FIG. 5, exclusively the diffraction reflexes of the minus and plus first orders (m=±1) are transmitted by the aperture slot 36 and the diffraction reflexes of the remaining orders are blocked, as illustrated in FIG. 5 by using the example of the diffraction light of zero order (m=0).

In the configuration according to FIG. 5, regarding mode of operation and polarization properties, the light source 5, the beam splitter 24, and the polarization changing element 28 may be formed in an analogous manner to the light source 5, the beam splitter 23, and the polarization changing element 28 according to FIG. 1.

The diffraction reflexes transmitted by the aperture 36, here the light, which runs out of the two slot openings 38, 40, of the diffraction reflexes of the minus first (m=−1) and plus first (m=+1) diffraction orders, interfere behind the aperture slot 36 at the location of the detector 13, thereby forming a stripe-shaped interference pattern 41, wherein a rotation of the mirror 7 leads to a displacement of the interference pattern 41 on the detector surface 47 in an analogous manner to the constellation described with reference to FIG. 1. In an analogous manner to the configuration described with reference to FIGS. 1 to 4, such a displacement of the interference pattern 41 can be detected by the light detector 13 (and by a reference light detector) as a change in brightness, and a change in the rotation angle and/or a rotation angle position of the mirror 7 and thus also of the shaft 3 can be detected by the evaluation unit 15 based on the change in brightness.

According to the configuration illustrated in FIG. 5, the spherical lens 34 thus serves as both the incoming beam focusing optics 34 and an optical element of an interference device 12, wherein the interference device 12 is formed of the spherical lens 34, the beam splitter 24, and the aperture 36. According to this configuration, the incoming beam focusing optics 34 is thus integrally formed with the interference device 12.

According to the embodiments described with reference to the FIGS. 1 to 5, only the plus first (m=+1) and minus first (m=−1) diffraction orders are respectively used for producing the interference pattern 41 by means of the interference devices 11 or 12. The optical interference device 11 or 12 may, however, be formed, e.g. by means of corresponding focusing devices and apertures, such as to bring the light of any other diffraction reflexes or diffraction orders to interference, wherein, e.g., the period of the interference pattern being generated on the light detector 13, and thus also the angle resolution which is achievable by the position detector, can be influenced by selecting the diffraction orders. From the entirety of the diffraction orders produced by the reflection grating 9 or the diffraction structure 27, associated Fourier components, which contribute to the production of the interference pattern on the detector, of the diffraction light 29 can be selected, e.g., via selecting individual diffraction orders (e.g. via apertures), and the spatial period of the interference pattern which is generated can thereby be influenced. For example, according to the above described configuration, an interference pattern having half the period length compared to an interference pattern produced by using all the diffraction orders (which are produced by the diffraction grating 9) results from selecting the plus first and minus first diffraction orders and masking the remaining diffraction orders. According to this configuration, a change in position of the light beam 17 on the reflection grating 9 about a period of the reflection grating 9 thus corresponds to two cycles of bright and dark of the brightness course 59, whereby, e.g., the angle resolution of the position detector 1 or 2 can correspondingly be doubled.

Figure 6:
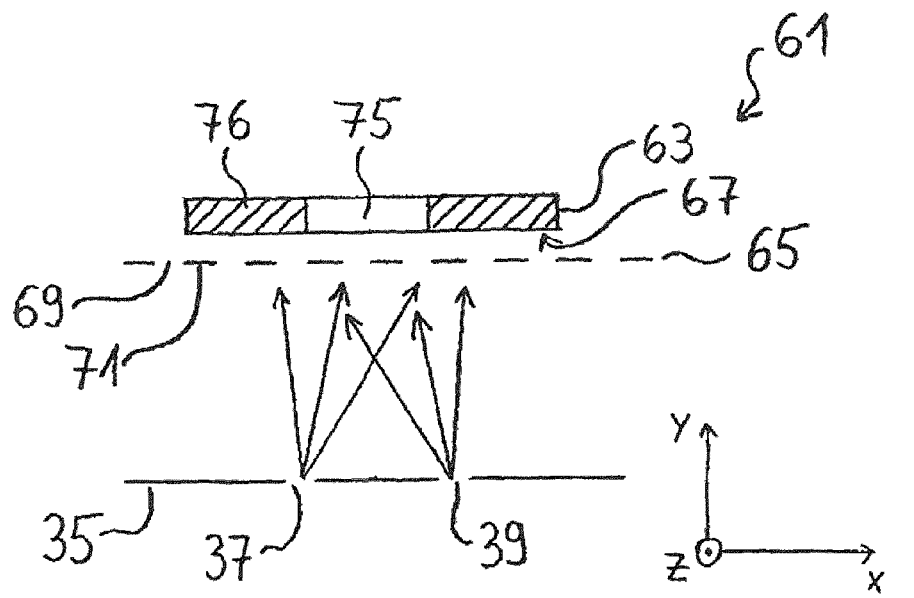
FIG. 6 shows a schematic illustration for explaining the mode of operation of a position detector according to a further embodiment utilizing the Moiré effect.
Figure 6:
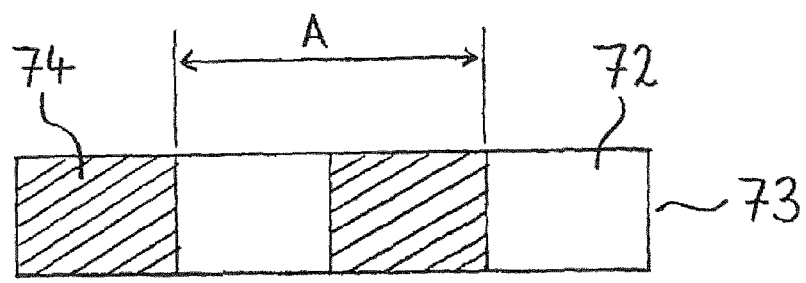
Figure 6:
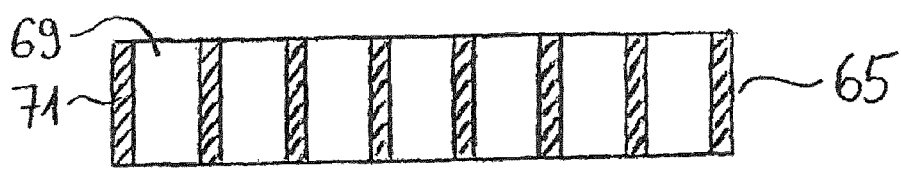
Figure 6:
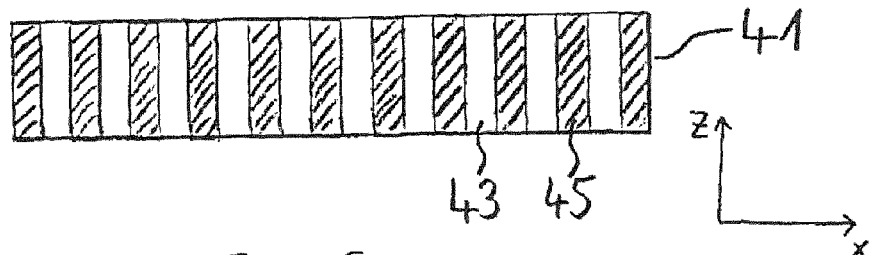

FIG. 6 illustrates the mode of operation of a position detector 61 according to a further embodiment, wherein the position detector 61 comprises a light detector 63, and wherein the optical interference device 11 or 12 (according to FIG. 1 or FIG. 5) further comprises a mask 65. Except for the light detector 63 and the mask 65, the structure of the position detector 61 corresponds to the structure of the position detector 1 according to FIG. 1 or of the position detector 2 according to FIG. 5, wherein the mask 65 is respectively disposed in front of the light detector in the optical path of the light coming from the respective aperture 35 or 36. In the following, the principle of operation of the position detector 61 is described with reference to the aperture 35 having the aperture openings 37, 39 on the basis of the structure according to FIG. 1, wherein, however, also an analogous configuration on the basis of the structure according to FIG. 5 with reference to the aperture 36 having the aperture openings 38, 40 is possible. The mask 65 is disposed in front of a detector surface 67 of the light detector 63 in parallel to the xz-plane of the xyz-coordinate system in the optical path of the light coming from the slot openings 37, 39 of the aperture slot 35 and comprises a stripe-shaped mask structure, which is spatially periodical along the x-direction, of light-transmissive mask portions 69, which extend in z-direction, and of opaque mask portions 71, wherein the mask structure comprises, e.g., a period which is different from the period of the stripe-shaped interference pattern 41. Because of the Moiré effect, as schematically illustrated in the lower part of FIG. 6, the superposition of the stripe-shaped structure of the mask 65 with the stripe-shaped interference pattern 41 results in a Moiré interference pattern 73, here a stripe-shaped Moiré interference pattern 73, which comprises a period A which is greater than the periods of the interference pattern 41 and of the structure of the mask 65 and which has an arrangement, which is periodical along the x-direction, of brighter stripes 72 and (in contrast thereto) darker stripes 74.

According to this configuration, the light detector 63 may, e.g., be formed in such a way that the detector surface 67 comprises only a single light-sensitive detector surface portion 75, wherein the dimension of the light-sensitive detector surface portion 75 (in x-direction) may correspond, e.g., to the dimension of the bright stripes of the Moiré interference pattern 73, e.g. may correspond to the half of the period A of the Moiré interference pattern (see FIG. 6). For example, the light-sensitive portion of a detector surface of a commercially available photo diode may be brought to a corresponding size, e.g., by applying an opaque coating. A displacement of the interference pattern 41 with a rotation of the mirror 7 leads to a displacement of the bright and dark stripes of the Moiré interference pattern 73 along the periodicity direction thereof (i.e. along the x-direction), what leads to a change of the brightness or light power detected by the light-sensitive detector surface portion 75 of the light detector 63, wherein a brightness course comprising this change in brightness can be detected by the light detector 63. The evaluation unit 15 is connected with the light detector 63 and may, e.g., be configured in an analogous manner to the configuration described with reference to FIG. 1 such as to be able to determine a change in rotation angle and/or a rotation angle position of the shaft 3 based on the brightness course detected by means of the light detector 63.

In an analogous manner to the light detector 13 of the embodiment according to FIG. 1, the detector surface 67 may also comprise a stripe-shaped structuring, which is periodical along the x-direction, of light-sensitive detector surface portions 75, which extend along the z-direction, and non-light-sensitive detector surface portions 76, wherein the structuring of the detector surface 67 comprises the same period as the Moiré interference pattern 73 (which is also periodical along the x-direction) when impinging on the detector surface 67 (wherein the width of the light-sensitive detector surface portions (in x-direction) may correspond, e.g., to the width of the bright stripes of the Moiré interference pattern 73 when impinging on the detector surface 67), and wherein the light detector 63 may, e.g., be configured such as to detect the total light power, i.e. the sum of the individual light powers detected by the individual light-sensitive detector surface portions, as a brightness signal. The evaluation of the brightness course according to this configuration may, e.g., be carried out in an analogous manner to the evaluation described with reference to the position detector 1.

Furthermore, for producing a Moiré interference pattern, the mask 65 may, e.g., also be formed with a period corresponding to the period of the interference pattern and be disposed in such a way that the structures of the interference pattern 41 and of the mask are twisted or tilted with respect to each other.

Figure 7:
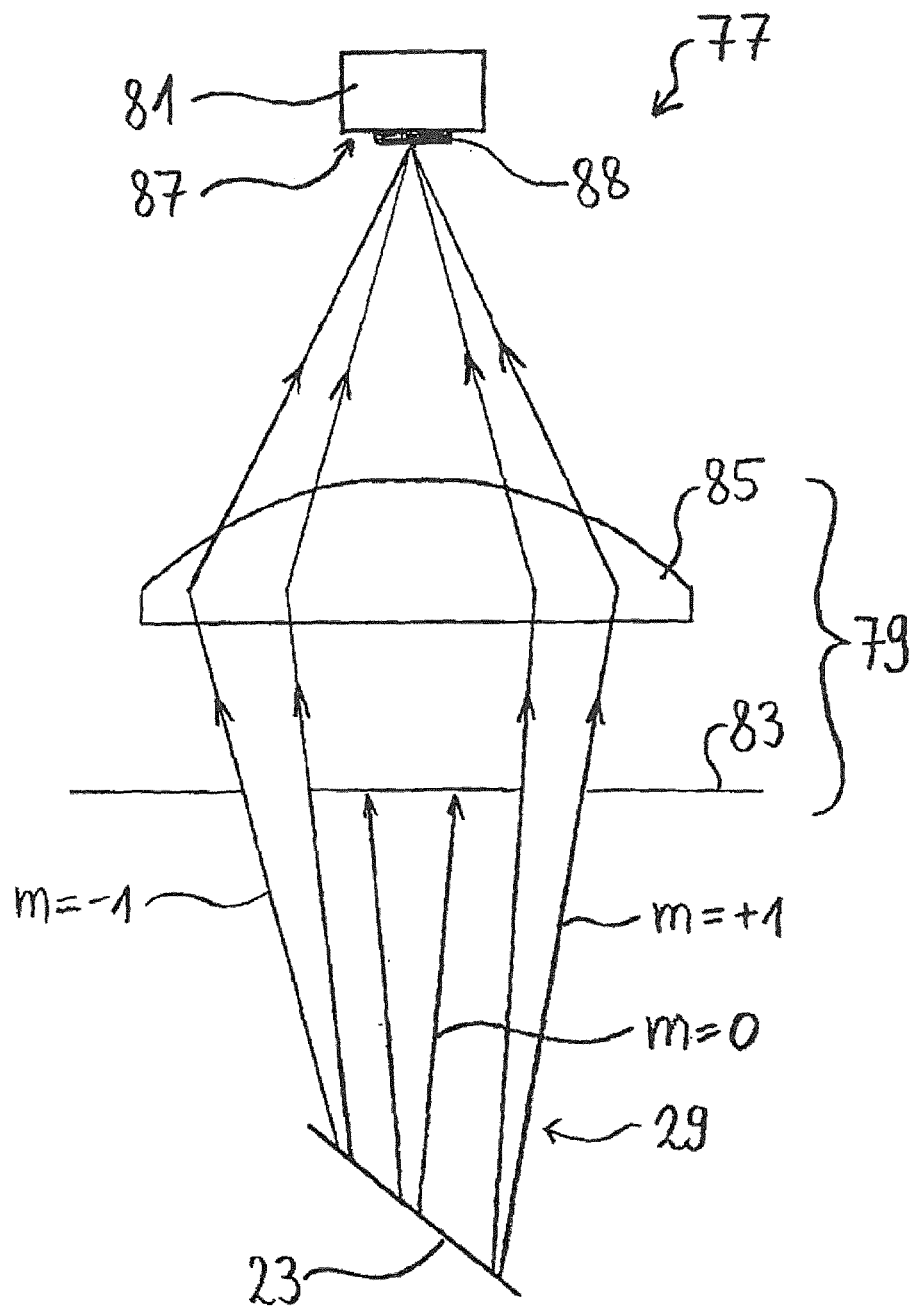
FIG. 7 shows a schematic top view of a part of a position detector according to a further embodiment.

FIG. 7 shows a part of a position detector 77 according to another embodiment, wherein the position detector 77 comprises an optical interference device 79 and a light detector 81. Except for the structure of the optical interference device 79 and the structure of the light detector 81, the structure of the position detector 77 corresponds to the structure of the position detector 1 according FIG. 1, wherein, however, according to FIG. 7, the individual diffraction reflexes (m=0, ±1), which run out of the beam splitter 23, respectively diverge slightly stronger (wherein the divergence of the diffraction light 29, as described above, can be adjusted, e.g., by a corresponding design of the incoming beam focusing optics).

According to the configuration shown in FIG. 7, the interference device 79 comprises an aperture, here formed as an aperture slot (slit diaphragm) 83, and a focusing optics, here formed as a focusing lens 85 (e.g. in form of a spherical lens or a cylindrical lens).

The aperture slot 83 is disposed in the optical path of the diffraction light 29 which is coupled out by the beam splitter 23 (wherein, in FIG. 7, only the diffraction reflexes of the orders m=0 and m=±1 are depicted by their respective border beams for better illustration) such as to transmit only the diffraction reflexes of the minus first (m=−1) and plus first (m=+1) diffraction orders, whereas the remaining diffraction orders are blocked, i.e. masked, by the aperture slot 83, as illustrated in FIG. 6 by using the example of the zero diffraction order (m=0).

Furthermore, the focusing optics which is in form of the focusing lens 85 is disposed and formed such as to focus the diffraction reflexes, which are selected by means of the aperture slot 83, of plus and minus first order on a common position on a detector surface 87 of the light detector 81 and to thus bring them to superposition, wherein, in the configuration according to FIG. 7, the light of the different diffraction orders m=±1 initially runs on different and separated optical paths towards the light detector 81 and is directly superposed for the first time at the common position on the detector surface 87 and interferes, thereby producing an interference pattern 88. The interference pattern 88 is in FIG. 7 indicated only schematically since it may substantially consist of a—according to the rotation angle position of the mirror 7—more or less bright light spot. The brightness or total brightness of the interference pattern 88 generated on the detector surface 87 varies with the phase relationship or phase difference of the light of the plus first order and the minus first order among themselves, i.e. with the rotation angle position of the mirror 7 or the shaft 3, wherein the spatial position of the interference pattern 88 may, however, be constant. The light detector 81 is, e.g., formed such as to detect the light power, resulting from the interference on the detector surface 87, as a brightness signal.

Figure 8:
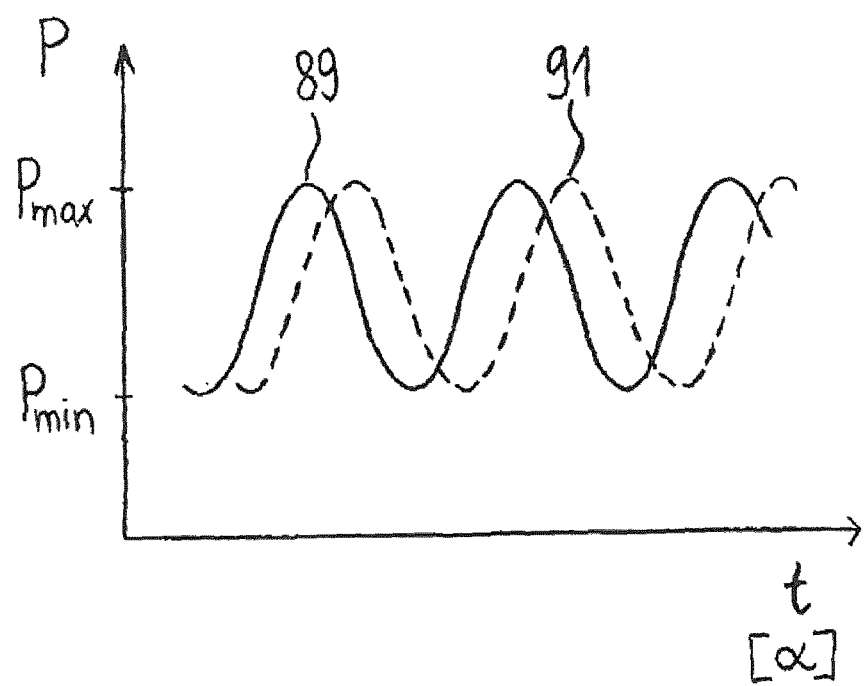
FIG. 8 shows an illustration of a brightness course and of a reference brightness course for explaining the mode of operation of the position detector shown in FIG. 6.

During a rotation of the mirror 7 and an accompanying change of the phase relationship of the light of the two diffraction orders m=±1, as depicted FIG. 8, the light power P detected on the detector surface 87 changes, e.g., between a maximum value which corresponds to a substantially constructive interference of the two diffraction orders m=±1 and a minimum value which corresponds to a substantially destructive interference of the two diffraction orders m=±1, wherein this change in brightness and the associated brightness course can be detected by the light detector 81, wherein the light detector 81 may initially detect, e.g., a brightness-time-course.

FIG. 8 shows as an example a brightness course 89 during rotating the mirror 7, wherein the horizontal axis indicates the time t, and wherein the light power P detected by the light detector 81 is plotted on the vertical axis. At constant rotation speed of the mirror 7, the brightness signal detected by the light detector 81 is periodical with the time, as depicted in FIG. 8, resulting in, e.g., a wavelike or sinusoidal brightness course. The time dependency of the light power P detected by the light detector 81 may, e.g., be converted to a rotation angle dependency by means of the evaluation unit 15, wherein the light power P varies periodically with the rotation angle α of the mirror 7, what is indicated in FIG. 8 by the parenthesized identifier α of the horizontal axis.

According to this embodiment, the evaluation unit 15 may, e.g., be formed in an analogous manner to the evaluation unit 15 described with reference to the position detector 1, wherein the evaluation unit 15 is connected with the light detector 81 and is, e.g., configured such as to be able to determine the rotation angle position of the mirror 7 and thus also of the shaft 3 based on the brightness course 89. For example, the evaluation unit 15 may be configured such as to be able to determine the associated change in rotation angle, e.g. in its absolute value, by counting or by evaluating the number of cycles of bright and dark in the brightness course 89 and/or the form of the brightness course 89, wherein the position detector 77 may, e.g., further comprise a rotation direction detector (not illustrated), which is connected with the evaluation unit 15, for determining the associated rotation direction. Thus, the evaluation unit 15 may, e.g., be configured such as to be able to determine a change in rotation angle, which is provided with an algebraic sign or a rotation direction, based on the brightness course 89 detected by the light detector 81 and on the rotation direction detected by the rotation direction detector.

According to the embodiments described with reference to the FIGS. 7 and 8, the rotation direction detector may also be realized, e.g., in form of a reference light detector (not illustrated), wherein, e.g., a part of the light of the diffraction orders m=±1 is superposed on the reference light detector and is thus brought to interference in such a way that a brightness course 91 detected by the reference light detector is phase shifted or time shifted, e.g. by a quarter period, with respect to the brightness course 89 (see FIG. 8). For example, one or more phase-shifting optical elements (not illustrated) may be provided which are disposed in the optical path of at least one of the two diffraction orders m=±1 and are configured such as to shift the phase of at least one of the two diffraction orders before impinging onto the reference light detector in such a way that the reference brightness course 91 is correspondingly phase shifted with respect to the brightness course 89. The evaluation unit 15 may, e.g., be connected with the reference light detector and configured such as to be able to determine the rotation direction, which is associated with a change in rotation angle, from the phase relationship between the brightness course 89 and the reference brightness course 91.

Figure 9:
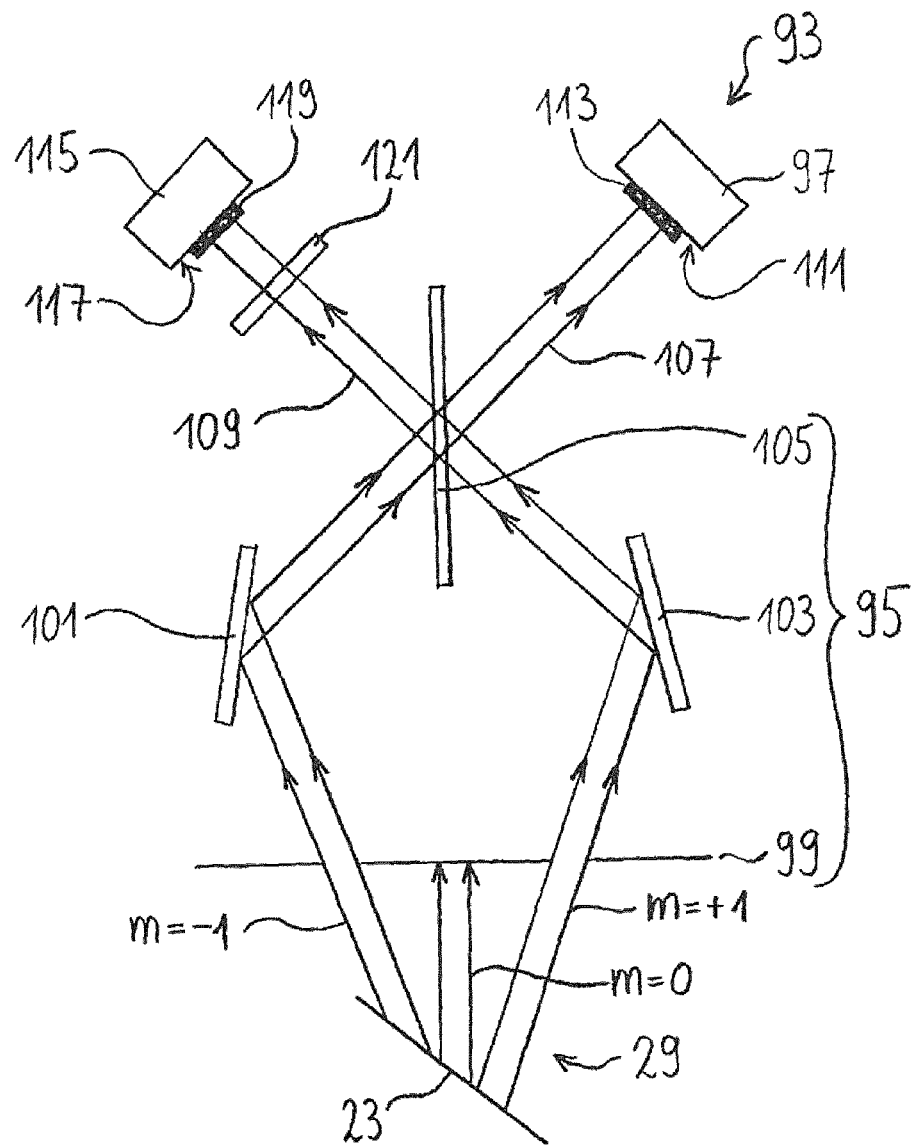
FIG. 9 shows a schematic top view of a part of a position detector according to a further embodiment.

FIG. 9 shows a part of a position detector 93 according to another embodiment, wherein the position detector 93 comprises an optical interference device 95 and a light detector 97. Except for the structure of the optical interference device 95 and the structure of the light detector 97, the structure of the position detector 93 corresponds to the structure of the position detector 1 according to FIG. 1.

According to the configuration illustrated in FIG. 9, interference device 95 comprises an aperture (diaphragm) 99, here formed as an aperture slot (slit diaphragm) 99, two deflection mirrors 101, 103 as well as a beam splitter 105, here formed as a bilaterally semi-transmissive, plane-parallel splitting mirror 105.

According to FIG. 9, the individual diffraction reflexes (m=0, ±1), which run out of the beam splitter 23, respectively extend substantially collimated in form of a substantially flat wave towards the aperture slot 99, wherein the divergence of the individual diffraction reflexes may be adjusted, e.g., by a corresponding design of the incoming beam focusing optics. The aperture slot 99 is disposed in the optical path of the diffraction light 29, which is coupled out by the beam splitter 23, such as to transmit only the diffraction reflexes of the minus first (m=−1) and plus first (m=+1) diffraction orders, whereas the remaining diffraction orders are blocked, i.e. the masked, by the aperture slot 99, as illustrated in FIG. 9 by using the example of the zero diffraction order (m=0).

Furthermore, the deflection mirrors 101, 103 and the splitting mirror 105 are disposed and formed in such a way that the diffraction reflex of the minus first order (m=−1) is reflected towards the semi-transmissive splitting mirror 105 by the deflection mirror 101 and that the diffraction reflex of the plus first order (m=+1) is reflected towards the semi-transmissive splitting mirror 105 by the deflection mirror 103 in such a way that a partial beam, which is transmitted (by the bilaterally semi-transmissive splitting mirror 105) and which corresponds to the minus first order (m=−1), and a partial beam, which is reflected (at the splitting mirror 105) and which corresponds to the plus first order (m=+1), run along a common optical path away from the splitting mirror 105, thereby producing an interference beam 107, and that a reflected partial beam, which corresponds to the minus first order (m=−1), and a transmitted partial beam, which corresponds to the plus first order (m=+1), run along a common optical path away from the splitting mirror 105, thereby producing an interference beam 109, respectively. The splitting mirror 105 may, e.g., be formed in such a way that each of the partial beams, which are reflected thereat or transmitted therefrom, comprises the same intensity. Thus, the light of the selected diffraction reflexes of the plus and minus first orders is brought to interference or superposition at the location of the splitting mirror 105 by means of the interference device 95.

The interference beam 107 which consists of the reflected partial beam of the plus first (m=+1) order and of the transmitted partial beam of the minus first (m=−1) order runs towards the light detector 97 and produces an interference pattern 113 on a detector surface 111 of the light detector 97, wherein the plus first and the minus first diffraction orders of the diffraction light are brought to superposition on the (common) impingement location of the interference beam 107 on the detector surface 111. In FIG. 9, the interference pattern 113 is indicated only schematically since it may substantially consist of a—according to the rotation angle position of the mirror 7—more or less bright light spot, wherein its total brightness varies with the phase relationship or phase difference of the light of the plus first order and of the minus first order among themselves, i.e. with the rotation angle position of the mirror 7 or the shaft 3. The light detector 97 is, e.g., formed such as to detect the light power, which results from the interference on the detector surface 111, as a brightness signal.

According to the configuration according FIG. 9, the selected different diffraction orders (m=±1) are thus brought to superposition (and thus to interference) on a common position on the light detector 97, thereby producing an interference pattern 113 which comprises a brightness which varies with the rotation angle position of the mirror 7, wherein, in contrast to the configuration according to FIG. 7, the light of the selected different diffraction orders is already superposed at a position before impinging onto the light detector 97 and then runs along a common optical path towards the light detector 97.

During a rotation of the mirror 7 and an accompanying change of the phase relationship of the light of the diffraction orders m=±1, the light power detected on the detector surface 111 changes, wherein this change in brightness may be detected by the light detector 97 as a change in brightness or a brightness course 89 in an analogous manner to the configuration described with reference to the FIGS. 7 and 8, and wherein a rotation angle position of the mirror 7 and thus of the shaft 3 may be detected by the evaluation unit 15 based on the change in brightness.

As illustrated in FIG. 9, the position detector 93 may further comprise a rotation direction detector in form of a reference light detector 115, wherein the reference light detector 115 is, e.g., disposed in the optical path of the interference beam 109 which consists of the transmitted partial beam of the plus first (m=+1) order and of the reflected partial beam of the minus first (m=−1) order and wherein the interference beam 109 produces a reference interference pattern 119 when impinging on a detector surface 117 of the reference light detector 115. The reference light detector 115 may be disposed and formed in such a way that a reference brightness course 91, which is detected correspondingly to the reference interference pattern 119 by the reference light detector 115, is phase shifted or time shifted with respect to the brightness course 89, e.g. by a quarter period (see FIG. 8). For example, an optical device 121 may be provided in the optical path of the interference beam 109 which optical device is configured such as to shift the phase of the light of at least one of the two diffraction orders in the interference beam 109 before the impingement on the reference light detector 115 in such a way that the reference brightness course 91 is correspondingly phase shifted with respect to the brightness course 89. The evaluation unit 15 may, e.g., be connected with the reference light detector 115 and be configured such as to be able to determine the rotation direction, which is associated with a change in rotation angle, from the phase relationship between the brightness course 89 and the reference brightness course 91.

According to the configuration according to FIG. 9, the diffraction reflexes of the plus and minus first orders (m=±1) initially run on separate optical paths from the reflection grating 9 toward the splitting mirror 105 and are brought to superposition at the location of the splitting mirror 105, wherein the respective partial beams of the plus first and minus first orders, which are respectively in form of the interference beams 107, 109, run from the splitting mirror 105 to the respective light detectors 97, 115 on a common optical path. However, the light beam 17 may also, e.g., be separated into two partial beams even before the impingement on the diffraction grating 9 in such a way that these partial beams respectively impinge on a common position on the diffraction grating 9 (however from different directions with respect to a corresponding grating normal) exactly at an angle, which angle would correspond to the diffraction angle of a certain diffraction order m (e.g. m=±1) of light 17 which impinges vertically onto the diffraction grating 9, wherein the diffraction light of the minus mth order of the one partial beam and the diffraction light of the plus mth order of the other partial beam run along the corresponding grating normal on a common optical path in the direction to the mirror 7 already from the diffraction grating 9 and thereafter to a corresponding light detector.

According to the embodiments described with reference to the FIGS. 7 to 9, only the plus first and minus first diffraction orders have been brought to interference by means of the interference optics 79 or 95. The optical interference device 79 or 95 may, however, also be formed, e.g. by means of corresponding focusing devices, apertures, mirrors and other optical elements, such as to bring the light of any other different diffraction orders to interference.

According to the embodiments described above, the position detector 1, 2, 61, 77, or 93 is configured in such a way that the light 17 coming from the laser diode 5 is diffracted only once by the diffraction grating which is in form of the reflection grating 9. However, the position detector may also be configured in such a way that the light of the light beam 17 is diffracted twice or multiple times at the diffraction grating of the position detector, e.g. at the reflection grating 9, for producing the diffraction light, what, e.g. during a rotation of the mirror 7 about a certain rotation angle, may lead to a stronger accompanying change of the phase relationships of the diffraction light and thus, e.g., to a reduce of the period of the brightness course which is detected by the respective light detector, and what may thus, e.g., allow for a higher angle resolution of the respective position detector. For example, it may be envisaged that the light emitted by the light source of the position detector is directed onto the diffraction grating via the mirror, is diffracted by the diffraction grating and that the diffraction light which is generated is directed to the interference device, wherein the interference device may be formed—e.g. by means of corresponding optical elements, such as deflection mirrors, lenses and apertures—such as to once more direct the diffraction light onto the diffraction grating and such that thus the diffraction light is diffracted once more by the diffraction grating, wherein, by the interference device, certain diffraction reflexes can be selected from the diffraction reflexes of the diffraction light which is now diffracted twice (or also multiple times) (e.g. according to one of the above described embodiments) and can be brought to interference, and wherein a change in brightness of the interference pattern which is consequently generated can be detected and evaluated, e.g., according to one of the above described embodiments.

Figure 10:
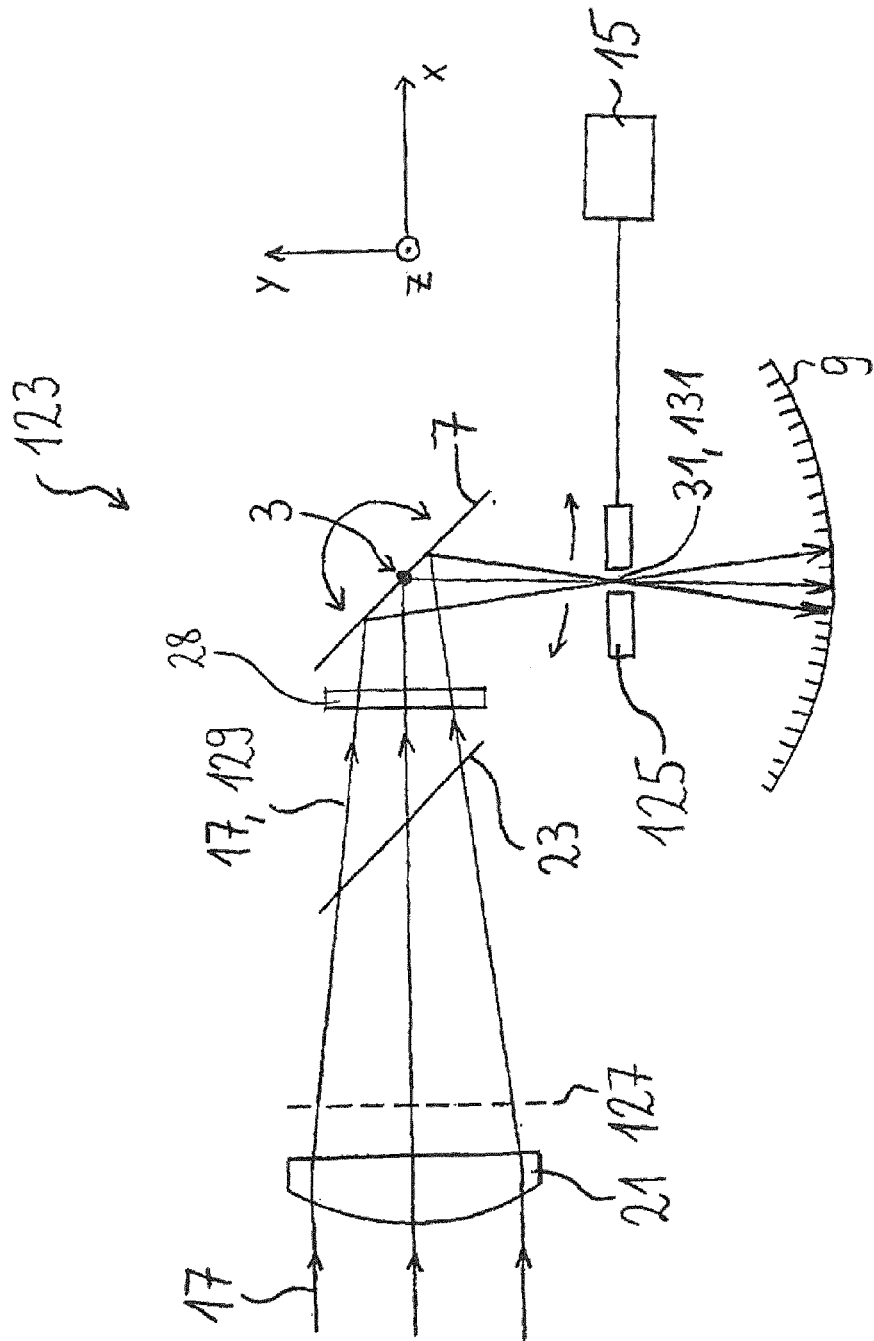
FIG. 10 shows a schematic top view of a part of a position detector according to a further embodiment having a reference position detector.
Figure 11:
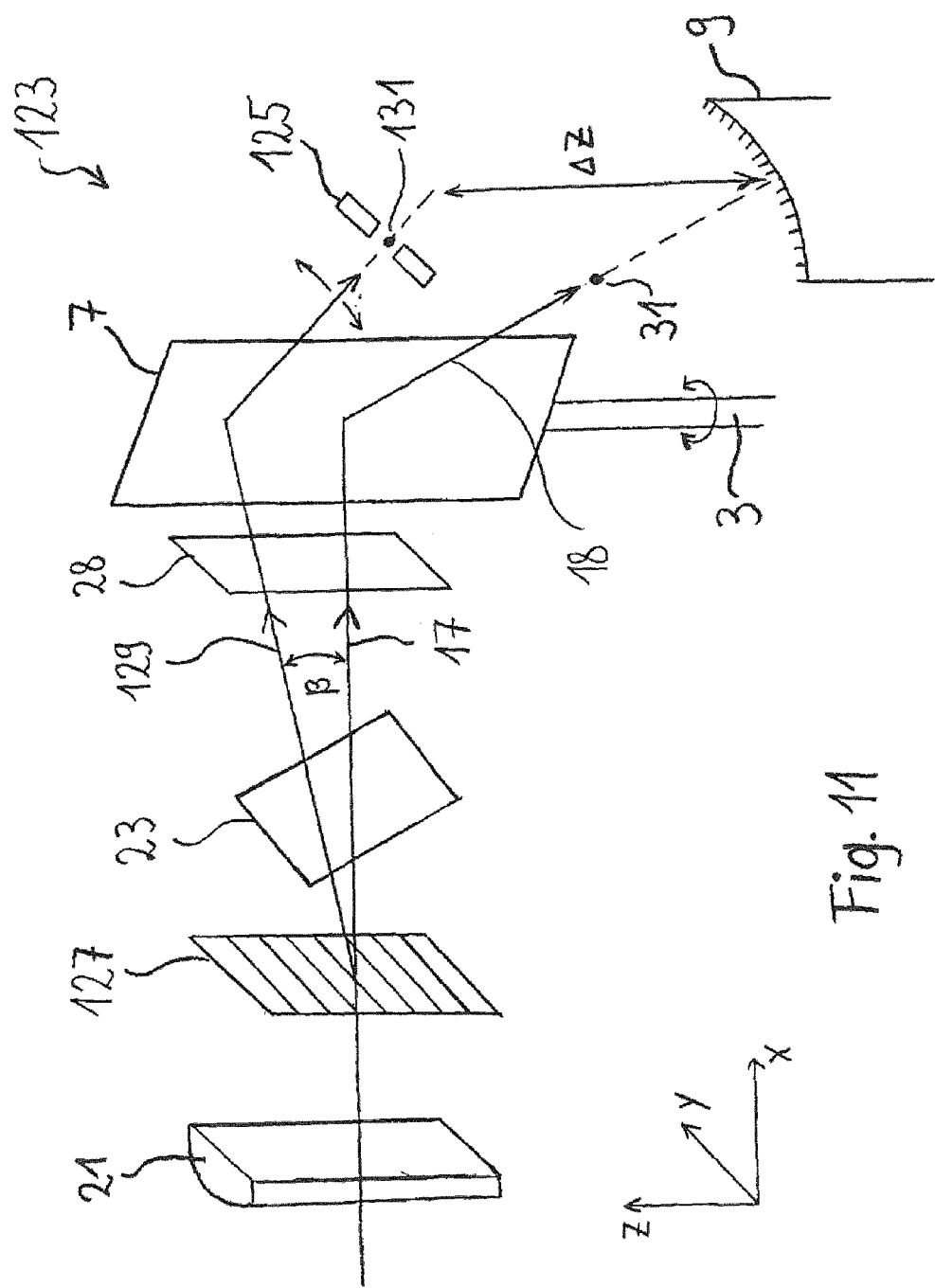
FIG. 11 shows a schematic perspective partial view of the position detector shown in FIG. 10.

The FIGS. 10 and 11 show respectively a part of a position detector 123 according to another embodiment, wherein the position detector 123 comprises a reference position light detector 125 and a partial beam outcoupling device, here formed as a partial beam outcoupling grating 127. Except for the reference position light detector 125 and the partial beam outcoupling device 127, the structure of the position detector 123 may, e.g., correspond to the structure of one of the position detectors 1, 2, 61, 77 and 93 (see FIG. 1 or FIG. 5), wherein, the principle of operation of the reference position light detector 125 is illustrated in the FIGS. 10 and 11 as an example based on the structure of the position detector 1 according to FIG. 1.

The partial beam outcoupling device 127 (here in form of the partial beam outcoupling grating 127) is disposed between the light source 5 and the mirror 7 in the optical path of the light beam 17, e.g. between the incoming beam focusing optics, which is in form of the cylindrical lens 21, and the beam splitter 23, and is formed such as to be able to couple a partial beam 129 out from the light beam 17 and to deflect it in the direction of the positive z-axis of the xyz-coordinate system such that the partial beam 129 is directed onto the mirror 7 while running at an angle β with respect to the light beam 17 (or with respect to a central main beam of the light beam 17) and is reflected by the mirror (see, e.g., FIG. 11).

The reference position light detector 125 is disposed at a position outside the optical path of the light beam 18 reflected by the mirror 7, e.g. at a position in a perpendicular distance Δz above the upper end of the reflection grating 9, such as to be passed by the reflected partial beam 129 during a rotation of the mirror 7. The reference position light detector 125 is further disposed in such a way that the partial beam 129 reflected by the mirror 7 impinges on the reference position light detector 125 only when the mirror 7 is located in a corresponding reference rotation angle position (or in a corresponding, small rotation angle range).

In the configuration according to the FIGS. 10 and 11, the partial beam 129 is coupled out from the light beam 17 after the light beam 17 passed through the incoming beam focusing optics which is in the form of the cylindrical lens 21, wherein the partial beam 129 is focused on an associated focus 131 by the incoming beam focusing optics. According to the present construction, the xy-position of the focus 131 of the partial beam 129 substantially coincides with the xy-position of the focus 31 of the light beam 17 or the reflected light beam 18, wherein the positions of these two focuses 31, 131 are different in z-direction, and wherein, when rotating the mirror 7, these two focuses 31, 131 pass over a respective, substantially circular focus trajectory. According to the present construction, the reference position light detector 125 is disposed at a position on the focus trajectory of the focus 131 of the partial beam 129.

The reference position light detector 125 may, e.g., be configured such as to be able to detect a change of the brightness or light power P, which is incident on it, and to be able to detect an associated reference position brightness course during the passing over with the focus 131 of the reflected partial beam 129. For example, the reference position light detector 125 may be configured in such a way that the reference position brightness course, which is detected during the passing over of the detector 125 with the focused, reflected partial beam 129 by the same, comprises a maximum, a minimum or a zero crossing when the shaft 3 or the mirror 7 are located in a corresponding reference rotation angle position $α_{ref}$. For example, as illustrated in the FIGS. 10 and 11, the reference position light detector 125 may be realized as a slit diode of which the difference signal comprises a zero crossing or of which the sum signal comprises a maximum when the focus 131 of the partial beam 129 moves over the middle of the slot of the slit diode (in the FIGS. 10 and 11, the slit diode is shown symbolically with a continuous slot for better illustration, wherein the slit diode in fact does not have to comprise such a slot). As a further example, the reference position light detector 125 may be realized as a light detector which is masked with a small slot and of which the output signal comprises a maximum when the focus 131 of the partial beam 129 moves over the slot of the light detector.

Figure 12:
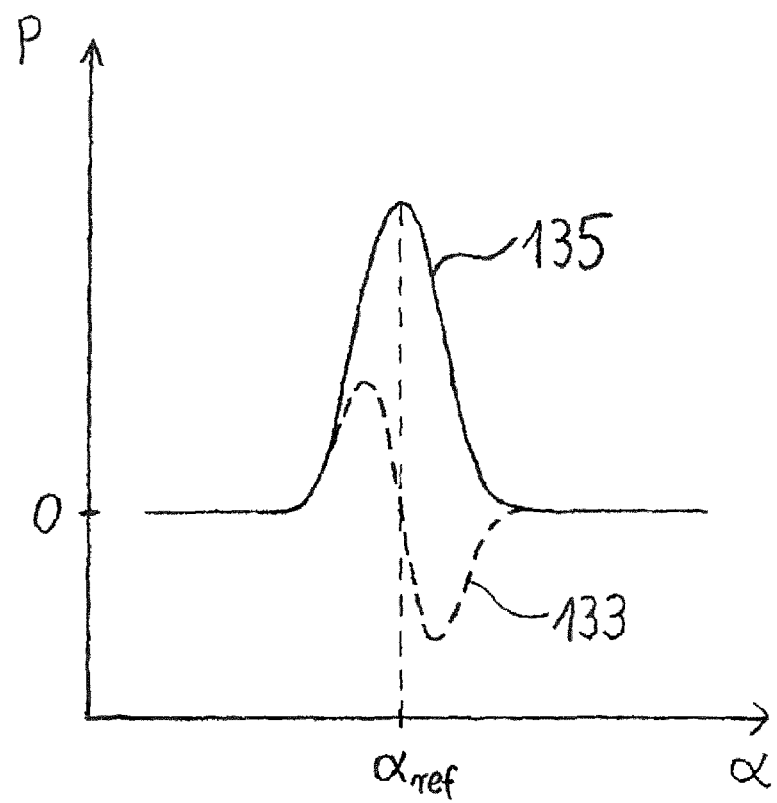
FIG. 12 shows an illustration for explaining a reference position brightness course.

FIG. 12 shows as an example two reference position brightness courses 133, 135. The brightness course 133 illustrates a difference signal 133 of the light powers P which are detected by the two diode elements of the reference position light detector which is in form of the slit diode 125, wherein this difference signal 133 comprises a zero crossing when the mirror 7 is located in the reference rotation angle position $α_{ref}$. The brightness course 135 illustrates a sum signal 135 of the light powers P which are detected by the two diode elements, wherein this sum signal 135 comprises a maximum when the mirror 7 is located in the reference rotation angle position $α_{ref}$.

The evaluation unit 15 is connected with the reference light detector 125 and is configured such as to be able to determine the reference rotation angle position $α_{ref}$ of the shaft 3 or of the mirror 7 from the reference position brightness course 133, 135. The evaluation unit 15 may, e.g., be configured such as to determine a zero crossing, a maximum or a minimum (or another characteristic) in the respective reference position brightness course 133, 135 and to identify the rotation angle position, which is associated with the respective extremum or characteristic, of the shaft 3 or of the mirror 7 as the reference rotation angle position $α_{ref}$.

In the following, further embodiments of the invention will be described. All of the embodiments and aspects of the invention described in the following can be combined with all of the embodiments described above and/or in the patent claims.

According to a further embodiment, the light coming from the incoming beam focusing optics (e.g. cylindrical lens 21 or spherical lens 34) may, e.g., be deflected towards the optical interference device (e.g. interference device 11, 12, 79, 95) without the use of a beam splitter (i.e., e.g., without beam splitter 23, 24). For example, the light coming from the incoming beam focusing optics (e.g. light beam 17) may impinge onto the curved grating (e.g. diffraction grating 9, e.g. reflection grating 9) at a certain angle (e.g. in a range of 0.1° to 5 and/or 5° to 20° and/or 20° to 40° and/or 40° to 89° and/or 4° to) 89° such that the optical axis of the beam reflected by the curved grating (e.g. beam 29) is tilted (i.e., e.g., defines an angle) with respect to the optical axis of the incident beam (e.g. beam 18). Thus, the incident and the returning beam may run in a spatially separated manner and may thus, e.g., get separated or be separated from each other without the use of a beam splitter.

According to a further embodiment, the diffraction pattern generated by the optical interference device is also used for the determination of the reference position. The reference position light detector (e.g. reference position light detector 125) may thereby, e.g., be realized integrally with the optical interference device (e.g. a reference position light detector may be provided integrally with the optical interference device 11, 12, 79, 95), however, a further interference or imaging device which is designed specifically for this purpose may be provided and/or used as well. For determination of the reference position, e.g., a local deviation in the interference pattern may be used (e.g. a reference mark may be placed at a certain position on the diffraction grating or grating lines may be omitted or the reflectivity or the diffraction efficiency may be locally modified). This deviation in the interference pattern may, e.g., be recorded by the same light detector by which also the brightness course of the interference pattern is detected (e.g. light detector 13, 63, 81, 97). An additional light detector may, however, also be provided and/ or used, which may be configured, e.g. modified or optimized, for, e.g., the position determination of the reference mark.

According to a further embodiment, one or more additional tracks (e.g. in addition to the periodical diffraction structure 27), which may, e.g., be used as reference marks, may be superimposed on the diffraction grating (e.g. diffraction grating 9). The additional track(s) may be located on the diffraction grating 9, e.g. offset in the z-direction (compare to, e.g., FIG. 1) next to the diffraction structure 27 or adjacent to the diffraction structure 27. The additional track(s) may also be formed on or in the diffraction structure 27 or integrally therewith. A track may be or comprise one or more feature(s)

(e.g. diffraction structure feature) which is (are) adapted for a diffraction of electromagnetic radiation (e.g. light, e.g. laser light, e.g. light beam 18) and/or which realizes (realize) the modulation of the electromagnetic radiation in a different manner, e.g. by a local modification of the reflection efficiency. For that purpose, a track may comprise any structures which are, e.g., adapted for diffracting light (e.g. a local deviation from a periodicity in the diffraction structure 27 may be provided (e.g. by the absence of grating lines) when an additional track is formed integrally with the diffraction structure 27, or the reflectivity or diffraction efficiency may be locally modified). An additional track may comprise features which are, e.g., adapted for being reference marks or for defining a certain rotation angle position (e.g. for detection of the lateral stops or of a maximum rotation angle position). These may be detected by the light detector (e.g. 13, 63, 81 and/or 97) or by an additional light detector (which may be optionally provided according to the invention). For example, the light detector 13, 63, 81 and/or 97 may be used when an additional track is disposed on/in/at/with the diffraction structure 27 and/or an additional light detector may be provided, e.g., when an additional track is provided in z-direction next to the diffraction structure 27. For imaging of the reference structures on the detector, an additional interference or imaging device which is specifically designed for this purpose may be provided. Also, only one interference device (e.g. interference device 11, 12, 79, 95) may, however, be provided and used for imaging or beam guiding of two or more tracks. For example, a periodical grating (e.g. diffraction structure 27) for producing the relative position value may be present in one track, and one or more absolute marking(s) for determination of the absolute position(s) may be present in a second track (e.g. additional track). If, as described before, e.g., only the $-1^{st}$ and $1^{st}$ diffraction orders are transmitted by the interference device, the transmitted amount of light for the reference position marking may be adjusted or get optimized by a suitable realization of the marking. The marking may, e.g., consists of multiple lines or grating lines, of which the distance is selected such that the diffracted light can pass through the interference device, e.g., with low losses.

According to an embodiment, a periodical grating (e.g. diffraction structure 27) may be provided in a first track and a reference marking may be provided in a second track, e.g. which is disposed offset thereto in z-direction on the reflection grating 9. The reference marking may, e.g., consist of three to eight webs (and/or another diffraction structure feature and/or another number) which are disposed at a position which corresponds to a middle position or another position of the mirror 7. Alternatively or additionally, reference markings may also be disposed at positions which substantially correspond to maximum rotation angle positions of the mirror 7. The additional track having reference marking(s) may be used to identify an absolute position of the mirror 7, and the first track having the periodical grating may be used to determine a relative position of the mirror 7 relative to the absolute position, e.g. by the detection of changes in brightness. According to an embodiment, a first reference marking which comprises a first number of features (e.g. webs, e.g. diffraction structure features, e.g. regions of changed reflectivity) may be provided at a rotation angle position of the mirror 7 which substantially corresponds to a maximum rotation angle position, and a second reference marking which comprises a second number of features may be provided at another position (e.g. a position which substantially corresponds to a middle position of the mirror 7). The second reference marking may be further away from a position, which corresponds to a maximum rotation angle position of the mirror, than the first reference marking. The first number of features may be greater than the second number of features, e.g. the first plurality may comprise 8 to 20 features (or another number) and the second plurality may comprise 3 to 5 features (or another number). For determining a position of the mirror, it may be determined (e.g. by means of the evaluation unit 15) whether a reference marking is detected by a light detector (e.g. light detector 13, 63, 81, 97 or by another light detector). If no reference marking is detected, the mirror 7 can be rotated in a direction, which corresponds to the direction from the second reference marking towards the first reference marking, until a reference mark is detected. If a reference marking is detected (e.g. directly or after rotating the mirror 7 in the direction which corresponds to the direction from the second reference marking towards the first reference marking), the mirror 7 may be rotated in a direction which corresponds to the direction from the first reference marking to the second reference marking. This rotation may be carried out until no reference marking is detected any longer by means of the light detector. Then, the mirror 7 may be rotated in an opposite direction (i.e., e.g., a direction which corresponds to the direction from the second towards the first reference marking). By the determination (e.g. by means of the evaluation unit 15) whether the number of features which is detected by a light detector as described above is greater than the second number of features and/or smaller than the first number of features, it can be determined whether the detected features are part of the first or of the second reference marking. It may also be determined (e.g. by means of the evaluation unit 15) whether the mirror 7 is located at a position which corresponds to the first reference marking or is located at a position which corresponds to the second reference marking, whereby, e.g., an absolute position of the mirror 7 may get/be determined.

According to a still further embodiment, a position of the mirror 7 may be determined by measuring a first sequence of cycles of bright and dark (or a brightness course) by means of a light detector (e.g. light detector 13, 63, 81, 97) over a rotation range (e.g. from a first maximum rotation angle position to a second maximum rotation angle position) of the mirror 7 and by saving the sequence in a data storage, e.g. saving the sequence permanently (e.g. the evaluation unit 15 may comprise a data storage and be correspondingly configured). By manufacturing deviations and the like or, e.g., by intentionally introduced deviations in the position detector (e.g. by the intentional introduction of deviations of a form, e.g. of an ideal form, of parts of a position detector), a deviation, which is substantially time-invariant and which is specific for a (e.g. each) position detector, of the sequence of cycles of bright and dark (or of the brightness course), i.e. also of the saved first sequence of cycles of bright and dark, from a theoretical (e.g. ideal) sequence of the brightness course over the rotation angle α of the mirror 7 may occur (i.e. over all or a part of the possible rotation angle positions which the mirror 7 may assume). For determining a position of the mirror 7, a second sequence of cycles of bright and dark may be measured (e.g. a second sequence of cycles of bright and dark may be measured with each activation or reset operation of a position detector or at another point in time). The second sequence of cycles of bright and dark may, e.g., get/be measured over the same rotation range of the mirror 7 over which the first sequence is measured, or over a part of a (e.g. this) rotation range. The second sequence may be compared to the first sequence of cycles of bright and dark, whereby a deviation angle between the first sequence and the second sequence of cycles of bright and dark can be calculated (e.g. by means of the evaluation unit 15) from the deviation of the first sequence from the second sequence (e.g., with reference to FIG. 4, the second sequence may be mathematically shifted until it substantially coincides with the first sequence, wherein the shifting may correspond to the deviation angle). By means of the deviation angle which is determined this way, the rotation angle position of the mirror 7 may be determined relatively with respect to the first sequence of cycles of bright and dark and may be determined absolutely by including one or more further information. For example, the position may be determined absolutely when the first sequence and the second sequence of cycles of bright and dark are measured over a maximum rotation angle range of the mirror 7 and/or a maximum rotation angle range (e.g. an absolute value of the maximum rotation angle range) of the mirror 7 (which, e.g., may be saved in the evaluation unit 15) is included in the determination. The position may also be determined absolutely when, e.g., a position which is determined by means of a reference marking as described herein is included as a further information for determination of an absolute position by means of the first sequence and the second sequence. The further information for determination of an absolute position may also, e.g., be determined by means of a mechanical stop (a component of a position detector, e.g., of a mirror 7). The further information may, e.g., be provided additionally or alternatively by means of a measuring device which is configured to measure an absolute position of the mirror 7 of a position detector (e.g. position detector 1, 2, 61, 77, 93 and/or 123). For example, the position detector may be fixedly clamped for this purpose and the deflection of a laser beam (e.g. generated by a laser or light source, which may be a part of the measuring device) via a mirror (e.g. mirror 7) of the position detector can be measured (e.g. via a measuring gauge or a measuring light detector, which may be part of the measuring device), whereby an absolute position of the mirror 7 can be measured and can be used as further information with the first sequence and the second sequence of cycles of bright and dark in order to determine (e.g. to calculate) an absolute position of the mirror 7. In other words, the position detector may, e.g., be calibrated one time by means of a measuring device, and then the absolute position of the mirror 7 can be determined based on specific, time-invariant deviations of the position detector without a measuring device having to be available anymore.

According to a further embodiment, the first sequence of cycles of bright and dark (e.g. brightness course) may also be/get calculated by means of an instruction (e.g. an algorithm). The instruction may be adapted to calculate an ideal course of cycles of bright and dark of a position detector (e.g. by means of the evaluation unit 15). A position of the mirror 7 may be determined by means of a comparison of the calculated, first (e.g. ideal) sequence of cycles of bright and dark and of the measured second sequence of cycles of bright and dark, optionally using a further information as described above, in order to determine an absolute position.

In all embodiments of the invention, an absolute position of the mirror 7 may be determined by determining the number of the cycles of bright and dark or the form of the brightness course (e.g. being caused by a periodical grating, e.g., diffraction structure 27), which occurred since an identification of an absolute position by the evaluation unit 15 (e.g. by means of reference markings as described above) caused by a rotation of the mirror 7 starting from the identified absolute position. In all embodiments, an absolute position of the mirror 7 may, e.g., be defined by detecting a reference marking (which may, e.g., be located in an additional track) as described above. When the reference marking is detected, the absolute position can be defined as that position which corresponds to a predetermined value of the brightness (e.g. in the brightness course) which value is, e.g., caused by the first track (e.g. periodical grating (e.g. diffraction structure 27)) and which value is located closest to the reference mark with respect to a rotation of the mirror 7. For example, an absolute position may be defined as that zero crossing (or another defined value, e.g. minimum value, e.g. maximum value) of the brightness course which course is caused by the first track, which crossing is located closest to the reference mark, which may be provided on the second track, with respect to a rotation of the mirror 7. When the reference mark is detected, an absolute position may also be defined based on the detected value of the brightness course which is caused by the first track. In other words, the absolute position may be determined or defined by detecting a reference mark caused by the second track and by then rotating the mirror 7 about a (e.g. very small) rotation angle until the brightness course which is caused by the first track reaches a predetermined value such that an absolute position is present. An absolute position may also be determined or defined by the value of the brightness course caused by the first track, which value is present when a reference mark is detected, i.e. it may not be necessary to further rotate the mirror 7.

The invention claimed is:

1. A position detector (1, 2, 61, 77, 93, 123) for determining the rotation angle position ($\alpha$) of an object (3) which is rotatably supported, in combination with the rotatably supported object (3), comprising:
   a light source (5) for producing a light beam (17),
   a diffraction grating (9),
   a mirror (7) which is connected to the object (3) in such a way that it co-rotates with the object (3) during a rotation of the object and which is disposed in such way that the light beam (17) is reflected therefrom onto the diffraction grating (9) and that, during a rotation of the mirror (7), the reflected light beam (18) passes over the diffraction grating (9) according to the rotation, wherein the light of the reflected light beam is diffracted by the diffraction grating (9), thereby producing diffraction light (29),
   an optical interference device (11, 12, 79, 95) which is disposed in the optical path of the diffraction light (29) and is configured such as to be able to bring different diffraction orders (m=−1, m=+1) of the diffraction light (29) to interference, thereby producing an interference pattern (41, 73, 88, 113),
   a light detector (13, 63, 81, 97) which is disposed and configured such as to be able to detect a change in brightness of the interference pattern (41, 73, 88, 113), which is caused by said passing over of the diffraction grating (9) with the reflected light beam (18), as well as a brightness course (57, 89) comprising the change in brightness, and
   an evaluation unit (15) which is connected with the light detector (13, 63, 81, 97) and is configured such as to be able to determine the rotation angle position ($\alpha$) of the object (3) based on the brightness course (57, 89).

2. The position detector according to claim 1, wherein the mirror (7) is formed integrally with the object (3).

3. The position detector according to claim 1, wherein the mirror (7) is shaped and disposed in such a way that a rotation axis of the object (3) extends in a mirror surface (25) of the mirror (7).

4. The position detector according to claim 1, wherein the diffraction grating (9) is a curved diffraction grating having a concavity facing towards the mirror (7).

5. The position detector according to claim 4, wherein the diffraction grating (9) is a cylinder-shaped diffraction grating (9) which is disposed concentrically to a rotation axis of the object (3).

6. The position detector according to claim 4, wherein the diffraction grating (9) is a reflection grating (9), further comprising an incoming beam focusing optics (21, 34) which is disposed between the light source (5) and the mirror (7) in the optical path of the light beam (17) and is configured such as to focus the light beam (18), which is reflected from the mirror (7) towards the reflection grating (9), on a focal point (31) or towards the vicinity of the focal point (31) of the reflection grating (9).

7. The position detector according to claim 6, wherein the incoming beam focusing optics (34) is integrally formed with the optical interference device (12).

8. The position detector according to claim 1, wherein the diffraction grating (9) is a reflection grating (9), further comprising:
   a beam splitter (23, 24) which is disposed between the light source (5) and the mirror (7) in the optical path of the light beam (17) and which is formed such as to substantially transmit light of a first polarization and to substantially reflect light of a second polarization, and
   a polarization changing element (28) which is disposed between the reflection grating (9) and the beam splitter (23, 24) in the optical path of the diffraction light (29) and which is formed such as to substantially convert the polarization of the diffraction light (29) to the first polarization or to the second polarization, wherein
   the beam splitter (23, 24) is disposed and formed such as to direct the diffraction light (29) to the optical interference device (11, 12).

9. The position detector according to claim 1, wherein the optical interference device (11, 12) comprises an aperture (35, 36) which is formed and disposed such as to substantially transmit only the different diffraction orders (m=−1, m=+1) of the diffraction light (29), and wherein the optical interference device (11, 12) is further configured such as to direct the different diffraction orders (m=−1, m=+1) of the diffraction light (29) to respectively corresponding openings (37, 39, 38, 40) of the aperture (35, 36).

10. The position detector (1, 2, 61) according to claim 1, wherein the optical interference device (11, 12) is configured such as to bring the different diffraction orders (m=−1, m=+1) of the diffraction light (29) to interference, thereby producing a spatially periodical interference pattern (41).

11. The position detector (1) according to claim 10, wherein a detector surface (47) of the light detector (13) comprises a spatially periodical structuring, having the same period as the spatially periodical interference pattern (41), of light-sensitive detector surface portions (49) and non-light-sensitive detector surface portions (51).

12. The position detector (61) according to claim 10, wherein the optical interference device (11) further comprises a mask (65) which comprises a spatially periodical structure of substantially light-transmissive portions (69) and substantially opaque portions (71) and is disposed such as to be able to produce a spatially periodical Moiré interference pattern (73) on a detector surface (67) of the light detector (63) via superposition of the spatially periodical structure of the mask (65) with the spatially periodical interference pattern (41).

13. The position detector (61) according to claim 12, wherein a detector surface (67) of the light detector (63) comprises a spatially periodical structuring, having the same period as the spatially periodical Moiré interference pattern (73), of light-sensitive detector surface portions (75) and non-light-sensitive detector surface portions (76).

14. The position detector (77, 93) according to claim 1, wherein the optical interference device (79, 95) is configured such as to bring the different diffraction orders (m=−1, m=+1) of the diffraction light (29) into superposition on a common position on the light detector (81, 97), thereby producing an interference pattern (88, 113) having a total brightness which varies with the rotation angle position.

15. The position detector (1, 2, 61, 77, 93, 123) according to claim 1, wherein the different diffraction orders (m=−1, m=+1) of the diffraction light (29) are the plus first diffraction order (m=+1) and the minus first diffraction order (m=−1).

16. The position detector (123) according to claim 1, further comprising:
   a reference position light detector (125) which is disposed such as to be passed over by a partial beam (129), reflected from the mirror (7), of the light beam (17) during a rotation of the mirror (7) and which is configured such as to be able to detect a reference position brightness course (133, 135) caused by said passing over, wherein
   the evaluation unit (15) is further connected with the reference position light detector (125) and is configured such as to be able to determine a reference rotation angle position ($\alpha_{ref}$) of the object (3) from the reference position brightness course (133, 135).

17. The position detector according to claim 16, further comprising a partial beam outcoupling device (127) which is disposed between the light source (5) and the mirror (7) in the optical path of the light beam (17) and configured such as to couple the partial beam (129) out and to direct it at an angle ($\beta$) relative to the light beam (17) towards the mirror (7) in such a way that it passes over the reference position light detector (125) during a rotation of the mirror.

18. The position detector according to claim 16, wherein the reference position light detector (125) is disposed at a focal point (131) of the incoming beam focusing optics (21).

19. A light deflection device with
   a rotatably disposed working beam deflection mirror for deflecting a working light beam, and
   a position detector (1, 2, 61, 77, 93, 123) according to claim 1 for determining the rotation angle position ($\alpha$) of the working beam deflection mirror which is the rotatably supported object (3).

* * * * *